(12) United States Patent
Tan et al.

(10) Patent No.: US 12,266,793 B2
(45) Date of Patent: Apr. 1, 2025

(54) ELECTRODES, ELECTRODE MATERIALS, AND MANUFACTURING THEREOF

(71) Applicant: UNIGRID, Inc., San Diego, CA (US)

(72) Inventors: Darren Huan Shen Tan, San Diego, CA (US); Erik Austin Wu, San Diego, CA (US)

(73) Assignee: UNIGRID, Inc., San Diego, CA (US)

( * ) Notice: Subject to any disclaimer, the term of this patent is extended or adjusted under 35 U.S.C. 154(b) by 42 days.

(21) Appl. No.: 18/204,836

(22) Filed: Jun. 1, 2023

(65) Prior Publication Data

US 2024/0405210 A1  Dec. 5, 2024

(51) Int. Cl.

| | | |
|---|---|---|
| *H01M 4/38* | (2006.01) | |
| *H01M 4/04* | (2006.01) | |
| *H01M 4/36* | (2006.01) | |
| *H01M 4/583* | (2010.01) | |
| *H01M 4/62* | (2006.01) | |
| *H01M 10/054* | (2010.01) | |
| *H01M 10/0562* | (2010.01) | |
| *H01M 10/0568* | (2010.01) | |

(Continued)

(52) U.S. Cl.
CPC ......... *H01M 4/387* (2013.01); *H01M 4/0404* (2013.01); *H01M 4/364* (2013.01); *H01M 4/583* (2013.01); *H01M 4/622* (2013.01); *H01M 10/054* (2013.01); *H01M 10/0562* (2013.01); *H01M 10/0568* (2013.01); *H01M 10/0569* (2013.01); *H01M 2004/021* (2013.01); *H01M 2004/027* (2013.01); *H01M 4/64* (2013.01); *H01M 2300/0028* (2013.01); *H01M 2300/0068* (2013.01); *H01M 2300/0071* (2013.01); *H01M 2300/008* (2013.01)

(58) Field of Classification Search
None
See application file for complete search history.

(56) References Cited

U.S. PATENT DOCUMENTS

| | | |
|---|---|---|
| 6,287,720 B1 | 9/2001 | Yamashita et al. |
| 12,002,927 B1 | 6/2024 | Tan et al. |

(Continued)

FOREIGN PATENT DOCUMENTS

| | | |
|---|---|---|
| CN | 109671936 A | 10/2019 |
| CN | 112310381 A | 6/2021 |

(Continued)

OTHER PUBLICATIONS

Kiaoqiong Du et al., "Stabilizing Microsized Sn Anodes for Na-Ion Batteries with Extended Ether Electrolyte Chemistry", ACS Publications, 2022, 8 pages.

(Continued)

*Primary Examiner* — Laura Weiner
(74) *Attorney, Agent, or Firm* — PROCOPIO, CORY, HARGREAVES & SAVITCH LLP

(57) ABSTRACT

Provided herein are electrode composite materials comprising a plurality of particles comprising tin (Sn), where at least some of the plurality of particles has an average particle diameter of from about 1 μm to about 200 μm. Electrodes and batteries incorporating the compounds, compositions, and composite materials are disclosed. Methods of manufacturing the compounds, compositions, and composite materials are also disclosed.

20 Claims, 15 Drawing Sheets

(51) Int. Cl.
  *H01M 10/0569* (2010.01)
  *H01M 4/02* (2006.01)
  *H01M 4/64* (2006.01)

(56) References Cited

U.S. PATENT DOCUMENTS

| | | |
|---|---|---|
| 2010/0035157 A1 | 2/2010 | Nakamura |
| 2015/0303517 A1 | 10/2015 | Kaguera |
| 2018/0069234 A1 | 3/2018 | Friend et al. |
| 2019/0233388 A1 | 8/2019 | Amine et al. |

FOREIGN PATENT DOCUMENTS

| | | | |
|---|---|---|---|
| DE | 698 36 514 T2 | * | 9/2007 |
| EP | 0317351 A2 | | 5/1989 |
| JP | 2014192093 A | | 10/2014 |
| JP | 2014199803 A | | 10/2014 |
| JP | 6459795 B2 | | 1/2019 |
| KR | 10-2004-0058082 | * | 7/2004 |
| KR | 20180068117 A | | 6/2018 |
| WO | 2020125562 A1 | | 6/2020 |

OTHER PUBLICATIONS

Microparticles, availble online at https://en.wikipedia.org/wiki/Microparticle#:-:text=Microparticles%20are%20particles%20between %200.1, %2C%20flour%2C%20and%20powdered%20sugar., date unknown.

ISR and Written Opinion for PCT/US2024/032127 dated Aug. 22, 2024, 13 pages.

Deysher et al., Evaluating Electrolyte—Anode Interface Stability in Sodium All-Solid-State Batteries, Applied Materials & Interfaces, vol. 14, Oct. 14, 2022. pp. 47706-47715.

ISR and Written Opinion for PCT/US2024/041006, dated Oct. 28, 2024, 8 pages.

Zhang, et al.—Microslzed Sn as Advanced Pnodes In Gly me-Based Electrolyte for Na-ton Batteries. Advanced Materia Is. 2016: <entire document. In particular pp. 4, 7. 10, Figures S13-S14>; <DOI: 10.1002/adma .. 201603212>.

Westman, et al. Diglyme based electrolytes for sodium-Ion batteries. ACS Applied Energy Materials vol. 1(6). 2018; pp. 9,31; p. S-3, figure S-4; DOI:10.1021/acsaem.8B00360.

* cited by examiner

Condition A ns
ELECTRODES, ELECTRODE MATERIALS, AND MANUFACTURING THEREOF

FIELD OF THE INVENTION

The field relates to electrodes and electrode material, cells and batteries comprising the same, and the manufacturing thereof.

BACKGROUND OF THE INVENTION

Batteries comprise one or more electrochemical cell, such cells generally comprising a cathode, an anode and an electrolyte. Sodium ion secondary batteries use a sodium transition metal oxide or ferrocyanide positive electrode active material and a hard carbon-based negative electrode active material and uses an organic liquid electrolyte to ensure sodium ionic conductivity between the positive electrode and the negative electrode.

SUMMARY OF THE INVENTION

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

The present disclosure is related to a plurality of particles comprising tin (Sn), the plurality of particles having an average particle diameter of from about 1 μm to about 200 μm.

The present disclosure is related to a plurality of particles comprising tin (Sn), the plurality of particles having a mass density from about 1 g/cm$^3$ to about 8 g/cm$^3$, wherein the plurality of particles optionally can have an average particle diameter of from about 1 μm to about 200 μm.

In some embodiments, the plurality of particles can have an average particle diameter of about 150 μm or less. In some embodiments, the plurality of particles can have an average particle diameter of about 120 μm or less. In some embodiments, the plurality of particles can have an average particle diameter of about 100 μm or less. In some embodiments, the plurality of particles can have an average particle diameter of about 90 μm or less. In some embodiments, the plurality of particles can have an average particle diameter of about 80 μm or less. In some embodiments, the plurality of particles can have an average particle diameter of about 75 μm or less. In some embodiments, the plurality of particles can have an average particle diameter of about 70 μm or less. In some embodiments, the plurality of particles can have an average particle diameter of about 65 μm or less. In some embodiments, the plurality of particles can have an average particle diameter of about 60 μm or less. In some embodiments, the plurality of particles can have an average particle diameter of about 55 μm or less. In some embodiments, the plurality of particles can have an average particle diameter of about 50 μm or less.

In some embodiments, the plurality of particles can have an average particle diameter of from about 1 μm to about 100 μm. In some embodiments, the plurality of particles can have an average particle diameter of from about 3 μm to about 90 μm. In some embodiments, the plurality of particles can have an average particle diameter of from about 3 μm to about 80 μm. In some embodiments, the plurality of particles can have an average particle diameter of from about 3 μm to about 75 μm. In some embodiments, the plurality of particles can have an average particle diameter of from about 3 μm to about 70 μm. In some embodiments, the plurality of particles can have an average particle diameter of from about 5 μm to about 70 μm. In some embodiments, the plurality of particles can have an average particle diameter of from about 5 μm to about 70 μm. In some embodiments, the plurality of particles can have an average particle diameter of from about 5 μm to about 65 μm. In some embodiments, the plurality of particles can have an average particle diameter of from about 5 μm to about 60 μm. In some embodiments, the plurality of particles can have an average particle diameter of from about 5 μm to about 55 μm. In some embodiments, the plurality of particles can have an average particle diameter of from about 5 μm to about 50 μm.

In some embodiments, the plurality of particles can have an average particle diameter of from about 1 μm to about 20 μm. In some embodiments, the plurality of particles can have an average particle diameter of from about 2 μm to about 15 μm. In some embodiments, the plurality of particles can have an average particle diameter of from about 3 μm to about 10 μm. In some embodiments, the plurality of particles can have an average particle diameter of from about 4 μm to about 6 μm. In some embodiments, the plurality of particles can have an average particle diameter of from about 20 μm to about 200 μm. In some embodiments, the plurality of particles can have an average particle diameter of from about 20 μm to about 150 μm. In some embodiments, the plurality of particles can have an average particle diameter of from about 25 μm to about 105 μm. In some embodiments, the plurality of particles can have an average particle diameter of from about 30 μm to about 90 μm. In some embodiments, the plurality of particles can have an average particle diameter of from about 35 μm to about 75 μm. In some embodiments, the plurality of particles can have an average particle diameter of from about 40 μm to about 60 μm. In some embodiments, the plurality of particles can have an average particle diameter of from about 45 μm to about 55 μm.

In some embodiments, the plurality of particles can have a mass density from about 2 g/cm$^3$ to about 8 g/cm$^3$. In some embodiments, the plurality of particles can have a mass density from about 3 g/cm$^3$ to about 7.5 g/cm$^3$. In some embodiments, the plurality of particles can have a mass density from about 3.5 g/cm$^3$ to about 7.3 g/cm$^3$. In some embodiments, the plurality of particles can have a mass density from about 4 g/cm$^3$ to about 7.2 g/cm$^3$.

In some embodiments, the plurality of particles may be collected by electric current to form the composition material. In some embodiments, the plurality of particles may be casted to form the composition material.

In some embodiments, the sodium tin may be $Na_x$—Sn, wherein x may be about 5.5 or less. In some embodiments, x may be about 5 or less. In some embodiments, x may be about 4.5 or less. In some embodiments, x may be about 4.0 or less. In some embodiments, x may be about 3.75 or less. In some embodiments, x may be about 3.5 or less. In some embodiments, x may be from about 0.05 to about 5.5. In some embodiments, x may be from about 0.1 to about 5.5. In some embodiments, x may be from about 0.1 to about 4. In some embodiments, x may be from about 0.1 to about 3.75.

In some embodiments, the plurality of particles essentially consists of Sn. In some embodiments, the plurality of particles consists of Sn. In some embodiments, at least some particles among the plurality of particles essentially consists of Sn. In some embodiments, at least some particles among the plurality of particles consists of Sn.

In some embodiments, the electrode composite material exhibits an electronic conductivity of at least about $10^{-8}$ S cm$^{-1}$. In some embodiments, the electrode composite material exhibits an electronic conductivity of from about $10^{-8}$ S cm$^{-1}$ to about 1000 S cm$^{-1}$. In some embodiments, the electrode composite material exhibits an electronic conductivity of from about $10^{-7}$ S cm$^{-1}$ to about 100 S cm$^{-1}$. In some embodiments, the electrode composite material exhibits an electronic conductivity of from about $10^{-6}$ S cm$^{-1}$ to about 50 S cm$^{-1}$. In some embodiments, the electrode composite material exhibits an electronic conductivity of from about $10^{-6}$ S cm$^{-1}$ to about 40 S cm$^{-1}$. In some embodiments, the electrode composite material exhibits an electronic conductivity of from about $10^{-6}$ S cm$^{-1}$ to about 30 S cm$^{-1}$. In some embodiments, the electrode composite material exhibits an electronic conductivity of from about $10^{-6}$ S cm$^{-1}$ to about 20 S cm$^{-1}$. In some embodiments, the electrode composite material exhibits an electronic conductivity of from about $10^{-5}$ S cm$^{-1}$ to about 10 S cm$^{-1}$.

The present disclosure is related to a negative electrode including the electrode composite material in some embodiments.

In some embodiments, the negative electrode may further comprise an active material layer including the electrode composite material. In some embodiments, the negative electrode may further comprise a current collector.

In some embodiments, the active material layer can have an average thickness of from about 1 µm to about 300 µm. In some embodiments, the active material layer can have an average thickness of from about 2 µm to about 250 µm. In some embodiments, the active material layer can have an average thickness of from about 3 µm to about 200 µm. In some embodiments, the active material layer can have an average thickness of from about 4 µm to about 190 µm. In some embodiments, the active material layer can have an average thickness of from about 5 µm to about 180 µm. In some embodiments, the active material layer can have an average thickness of from about 5 µm to about 170 µm. In some embodiments, the active material layer can have an average thickness of from about 5 µm to about 160 µm. In some embodiments, the active material layer can have an average thickness of from about 5 µm to about 150 µm. In some embodiments, the active material layer can have an average thickness of from about 5 µm to about 140 µm. In some embodiments, the active material layer can have an average thickness of from about 5 µm to about 130 µm. In some embodiments, the active material layer can have an average thickness of from about 5 µm to about 120 µm. In some embodiments, the active material layer can have an average thickness of from about 5 µm to about 110 µm.

In some embodiments, the active material layer can have an average thickness of from about 5 µm to about 100 µm. In some embodiments, the active material layer can have an average thickness of from about 5 µm to about 90 µm. In some embodiments, the active material layer can have an average thickness of from about 5 µm to about 80 µm. In some embodiments, the active material layer can have an average thickness of from about 5 µm to about 70 µm. In some embodiments, the active material layer can have an average thickness of from about 5 µm to about 60 µm. In some embodiments, the active material layer can have an average thickness of from about 5 µm to about 50 µm.

In some embodiments, the active material layer can have an average thickness of from about 10 µm to about 200 µm. In some embodiments, the active material layer can have an average thickness of from about 10 µm to about 190 µm. In some embodiments, the active material layer can have an average thickness of from about 10 µm to about 180 µm. In some embodiments, the active material layer can have an average thickness of from about 10 µm to about 170 µm. In some embodiments, the active material layer can have an average thickness of from about 10 µm to about 160 µm. In some embodiments, the active material layer can have an average thickness of from about 10 µm to about 150 µm. In some embodiments, the active material layer can have an average thickness of from about 10 µm to about 140 µm. In some embodiments, the active material layer can have an average thickness of from about 10 µm to about 130 µm. In some embodiments, the active material layer can have an average thickness of from about 10 µm to about 120 µm. In some embodiments, the active material layer can have an average thickness of from about 10 µm to about 110 µm. In some embodiments, the active material layer can have an average thickness of from about 10 µm to about 100 µm.

In some embodiments, the active material layer can have an average thickness of from about 10 µm to about 90 µm. In some embodiments, the active material layer can have an average thickness of from about 10 µm to about 80 µm. In some embodiments, the active material layer can have an average thickness of from about 10 µm to about 70 µm. In some embodiments, the active material layer can have an average thickness of from about 10 µm to about 60 µm. In some embodiments, the active material layer can have an average thickness of from about 10 µm to about 50 µm.

In some embodiments, the active material layer may be formed on the current collector. In some embodiments, the current collector can comprise a conductive material. In some embodiments, the plurality of particles may be bound to the current collector to form the active material layer. In some embodiments, the plurality of particles may be collected by electric current on the current collector to form the active material layer. In some embodiments, the plurality of particles may be casted on the current collector to form the active material layer. In some embodiments, the negative electrode can further comprise at least one other active material layer. In some embodiments, the plurality of particles may be formed before it may be incorporated into the negative electrode.

In some embodiments, the plurality of particles may be combined with a solvent to form a slurry, applied to the current collector, and dried to form the active material layer. In some embodiments, the solvent may be an organic solvent. In some embodiments, the solvent can comprise a compound selected from the group consisting of water, ethanol, isopropanol, may be N-Methyl-2-pyrrolidone (NMP), xylene, toluene, hexane, heptane, isobutyl butyrate, or combinations thereof. In some embodiments, the solvent may be xylene. In some embodiments, the solvent may be a polar solvent. In some embodiments, the solvent may be water. In some embodiments, the solvent may be N-Methyl-2-pyrrolidone (NMP). In some embodiments, the solvent can include water.

In some embodiments, the conductive material can comprise a metal. In some embodiments, the conductive material can comprise a material selected from the group consisting of stainless steel, copper, aluminum, nickel, titanium, sintered carbon, aluminum treated with carbon, nickel, titanium or silver, or stainless steel treated with carbon, nickel, titanium or silver, and combinations thereof. In some embodiments, the conductive material can comprise a material selected from the group consisting of graphite, carbon black, carbon fibers or metal fibers, metal powder, conductive whiskers, conductive metal oxide, activated carbon, polyphenylene derivatives, and combinations thereof. In some embodiments, the conductive material can comprise a material selected from the group consisting of natural graphite, artificial graphite, super-p, acetylene black, ketjen black, channel black, furnace black, lamp black, thermal black, denka black, vapor grown carbon fiber, carbon nanotubes, carbon nanofibers and combinations thereof. In some embodiments, the conductive material can include metal or carbon.

In some embodiments, the slurry further can comprise a binder resin. In some embodiments, the binder resin can comprise a compound selected from the group consisting of styrene-butadiene rubber, carboxymethyl cellulose, sodium carboxymethyl cellulose, polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

In some embodiments, the active material layer can have a bulk density before first charge/discharge cycle of from about 1 g/cm$^3$ to about 7 g/cm$^3$. In some embodiments, the active material layer can have a bulk density before first charge/discharge cycle of from about 2 to about 7 g/cm$^3$. In some embodiments, the active material layer can have a bulk density before first charge/discharge cycle of from about 1 g/cm$^3$ to about 8 g/cm$^3$. In some embodiments, the active material layer can have a bulk density before first charge/discharge cycle of from about 2 g/cm$^3$ to about 7.5 g/cm$^3$. In some embodiments, the active material layer can have a bulk density before first charge/discharge cycle of from about 3 g/cm$^3$ to about 7.3 g/cm$^3$. In some embodiments, the active material layer can have a bulk density before first charge/discharge cycle of from about 3.5 g/cm$^3$ to about 7.2 g/cm$^3$.

The present disclosure is related to a battery comprising a negative electrode according to the present disclosure, a positive electrode and an electrolyte, such as an electrolyte comprising a solid state electrolyte or a liquid electrolyte soaked separator membrane interposed between the negative electrode and the positive electrode.

In some embodiments, the electrolyte can comprise at least one solid or liquid electrolyte material selected from the group consisting of solid borohydride material ($Na_2B_{10}H_{10}$, $Na_2B_{12}H_{12}$, $NaCB_{11}H_{12}$), solid sulfide-based solid electrolyte ($Na_3PS_4$), liquid ether-based electrolyte ($NaPF_6$ in glyme, diglyme or triglyme, or other ethers), liquid carbonate based electrolyte ($NaPF_6$ in Ethylene carbonate and Dimethyl carbonate), or combination thereof.

In some embodiments, the positive electrode can comprise a positive electrode active material layer, wherein the positive electrode active material layer can comprise sodium transition metal oxide or sodium transition metal polyanionic oxide active material as a positive electrode active material and the transition metal can comprise at least one of Ni, Cr, Mn, Fe or V. In some embodiments, the positive electrode can comprise a positive electrode active material layer, and wherein the positive electrode active material layer can comprise sodium ferrocyanide positive electrode as a positive electrode active material, and the positive electrode can comprise at least one of Fe or Mn. In some embodiments, the positive electrode can comprise a positive electrode active material layer, and wherein the positive electrode active material layer further can comprise at least one of a binder resin, a conductive material or a solid electrolyte. In some embodiments, the positive electrode active material layer may be obtained using a manufacturing method according to a dry mixing process without a solvent.

In some embodiments, the battery can have an NP ratio of from about 0.1 to about 30. In some embodiments, the battery can have an NP ratio of from about 0.5 to about 10. In some embodiments, the battery can have an NP ratio of from about 0.8 to about 10. In some embodiments, the battery can have an NP ratio of from about 1.0 to about 10. In some embodiments, the battery can have an NP ratio of from about 1.0 to about 5. In some embodiments, the battery can have an NP ratio of from about 1.0 to about 1.5.

In some embodiments, the battery can have a coulombic efficiency of at least about 70% for the first 12 cycles. In some embodiments, the battery can have a coulombic efficiency of at least about 70% for the first 8 cycles. In some embodiments, the battery can have a coulombic efficiency of at least about 70% for the first 6 cycles. In some embodiments, the battery can have a coulombic efficiency of at least about 70% for the first 4 cycles. In some embodiments, the battery can have a coulombic efficiency of at least about 70% for the first 2 cycles. In some embodiments, the battery can have a coulombic efficiency of at least about 70% for the first 20 cycles. In some embodiments, the battery can have a coulombic efficiency of at least about 70% for the first 30 cycles. In some embodiments, the battery can have a coulombic efficiency of at least about 70% for the first 40 cycles. In some embodiments, the battery can have a coulombic efficiency of at least about 70% for the first 50 cycles.

In some embodiments, the battery can have a coulombic efficiency of at least about 90% for the first 20 cycles. In some embodiments, the battery can have a coulombic efficiency of at least about 90% for the first 30 cycles. In some embodiments, the battery can have a coulombic efficiency of at least about 90% for the first 40 cycles. In some embodiments, the battery can have a coulombic efficiency of at least about 90% for the first 50 cycles.

In some embodiments, the battery can have a coulombic efficiency of at least about 70% for the first 60 cycles. In some embodiments, the battery can have a coulombic efficiency of at least about 90% for the first 70 cycles. In some embodiments, the battery can have a coulombic efficiency of at least about 70% for the first 80 cycles. In some embodiments, the battery can have a coulombic efficiency of at least about 90% for the first 90 cycles. In some embodiments, the battery can have a coulombic efficiency of at least about 70% for the first 100 cycles.

The present disclosure is related to an active material layer comprising an electrode composite material including a plurality of particles comprising tin (Sn), wherein the active material layer can have a bulk density before first charge/discharge cycle of from about 1 g/cm$^3$ to about 8 g/cm$^3$.

In some embodiments, the negative electrode comprises a current collector.

In some embodiments, the active material layer can have a bulk density before first charge/discharge cycle of from about 2 g/cm$^3$ to about 8 g/cm$^3$. In some embodiments, the active material layer can have a bulk density before first charge/discharge cycle of from about 3 g/cm$^3$ to about 8 g/cm$^3$. In some embodiments, the active material layer can have a bulk density before first charge/discharge cycle of from about 3.5 g/cm$^3$ to about 8 g/cm$^3$. In some embodiments, the active material layer can have a bulk density before first charge/discharge cycle of 1 to 7 g/cm³. In some embodiments, the active material layer can have a bulk density before first charge/discharge cycle of 2 to 7 g/cm³.

In some embodiments, the active material layer can have a thickness of from about 3 μm to about 200 μm. In some embodiments, the active material layer can have a thickness of from about 4 μm to about 190 μm. In some embodiments, the active material layer can have a thickness of from about 5 μm to about 180 μm. In some embodiments, the active material layer can have a thickness of from about 5 μm to about 170 μm. In some embodiments, the active material layer can have a thickness of from about 5 μm to about 160 μm. In some embodiments, the active material layer can have a thickness of from about 5 μm to about 150 μm. In some embodiments, the active material layer can have a thickness of from about 5 μm to about 140 μm. In some embodiments, the active material layer can have a thickness of from about 5 μm to about 130 μm. In some embodiments, the active material layer can have a thickness of from about 5 μm to about 120 μm. In some embodiments, the active material layer can have a thickness of from about 5 μm to about 110 μm. In some embodiments, the active material layer can have a thickness of from about 5 μm to about 100 μm. In some embodiments, the active material layer can have a thickness of from about 5 μm to about 90 μm. In some embodiments, the active material layer can have a thickness of from about 5 μm to about 80 μm. In some embodiments, the active material layer can have a thickness of from about 5 μm to about 70 μm. In some embodiments, the active material layer can have a thickness of from about 5 μm to about 60 μm. In some embodiments, the active material layer can have a thickness of from about 5 μm to about 50 μm.

In some embodiments, the active material layer can have a thickness of from about 10 μm to about 200 μm. In some embodiments, the active material layer can have a thickness of from about 10 μm to about 190 μm. In some embodiments, the active material layer can have a thickness of from about 10 μm to about 180 μm. In some embodiments, the active material layer can have a thickness of from about 10 μm to about 170 μm. In some embodiments, the active material layer can have a thickness of from about 10 μm to about 160 μm. In some embodiments, the active material layer can have a thickness of from about 10 μm to about 150 μm. In some embodiments, the active material layer can have a thickness of from about 10 μm to about 140 μm. In some embodiments, the active material layer can have a thickness of from about 10 μm to about 130 μm. In some embodiments, the active material layer can have a thickness of from about 10 μm to about 120 μm. In some embodiments, the active material layer can have a thickness of from about 10 μm to about 110 μm. In some embodiments, the active material layer can have a thickness of from about 10 μm to about 100 μm.

In some embodiments, the active material layer can have a thickness of from about 10 μm to about 90 μm. In some embodiments, the active material layer can have a thickness of from about 10 μm to about 80 μm. In some embodiments, the active material layer can have a thickness of from about 10 μm to about 70 μm. In some embodiments, the active material layer can have a thickness of from about 10 μm to about 60 μm. In some embodiments, the active material layer can have a thickness of from about 10 μm to about 50 μm.

The present disclosure is related to a negative electrode including a plurality of particles comprising tin (Sn), a positive electrode, and an electrolyte, wherein the battery can have a negative electrode capacity to positive electrode capacity (N/P) ratio of about 0.1 to about 30.0.

In some embodiments, the battery can have an NP ratio of about 0.5 to about 10. In some embodiments, the battery can have an NP ratio of about 0.8 to about 10. In some embodiments, the battery can have an NP ratio of about 1.0 to about 10. In some embodiments, the battery can have an NP ratio of about 1.0 to about 5. In some embodiments, the battery can have an NP ratio of about 1.0 to about 1.5.

In some embodiments, the battery can have a coulombic efficiency of at least about 70% for the first 12 cycles. In some embodiments, the battery can have a coulombic efficiency of at least about 70% for the first 8 cycles. In some embodiments, the battery can have a coulombic efficiency of at least about 70% for the first 6 cycles. In some embodiments, the battery can have a coulombic efficiency of at least about 70% for the first 4 cycles. In some embodiments, the battery can have a coulombic efficiency of at least about 70% for the first 2 cycles. In some embodiments, the battery can have a coulombic efficiency of at least about 70% for the first 20 cycles. In some embodiments, the battery can have a coulombic efficiency of at least about 70% for the first 30 cycles. In some embodiments, the battery can have a coulombic efficiency of at least about 70% for the first 40 cycles. In some embodiments, the battery can have a coulombic efficiency of at least about 70% for the first 50 cycles.

In some embodiments, the battery can have a coulombic efficiency of at least about 90% for the first 20 cycles. In some embodiments, the battery can have a coulombic efficiency of at least about 90% for the first 30 cycles. In some embodiments, the battery can have a coulombic efficiency of at least about 90% for the first 40 cycles. In some embodiments, the battery can have a coulombic efficiency of at least about 90% for the first 50 cycles. In some embodiments, the battery can have a coulombic efficiency of at least about 70% for the first 60 cycles. In some embodiments, the battery can have a coulombic efficiency of at least about 90% for the first 70 cycles. In some embodiments, the battery can have a coulombic efficiency of at least about 70% for the first 80 cycles. In some embodiments, the battery can have a coulombic efficiency of at least about 90% for the first 90 cycles. In some embodiments, the battery can have a coulombic efficiency of at least about 70% for the first 100 cycles.

BRIEF DESCRIPTION OF THE DRAWINGS

It is to be expressly understood that the drawings are for the purpose of illustration and description only and are not intended as a definition of the limits of the invention.

DETAILED DESCRIPTION OF THE INVENTION

Figure 1:
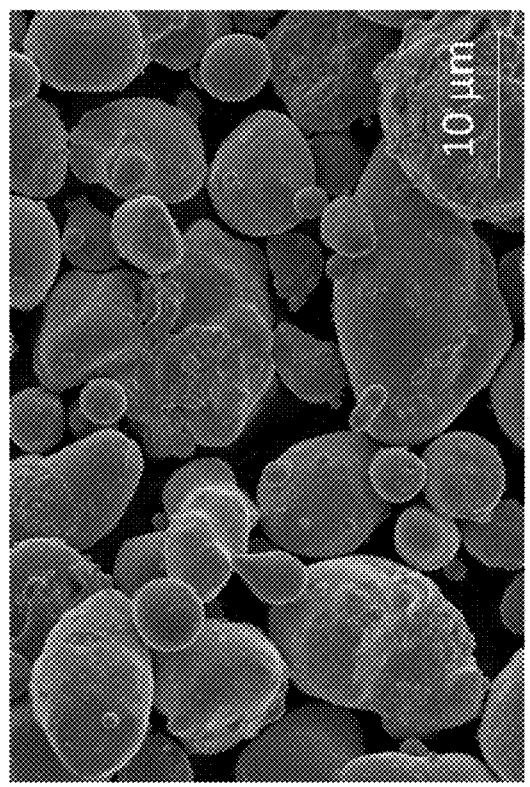
FIG. 1 are microscope images showing tin (Sn) prepared under condition A. Average particle sizes ranging from 5 μm to 50 μm are displayed and labelled as condition A in some embodiments.
Figure 1:
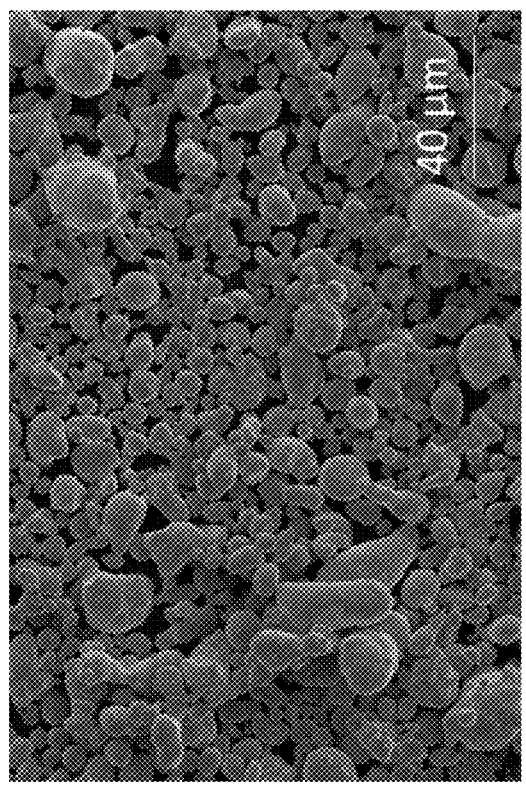
Figure 1:
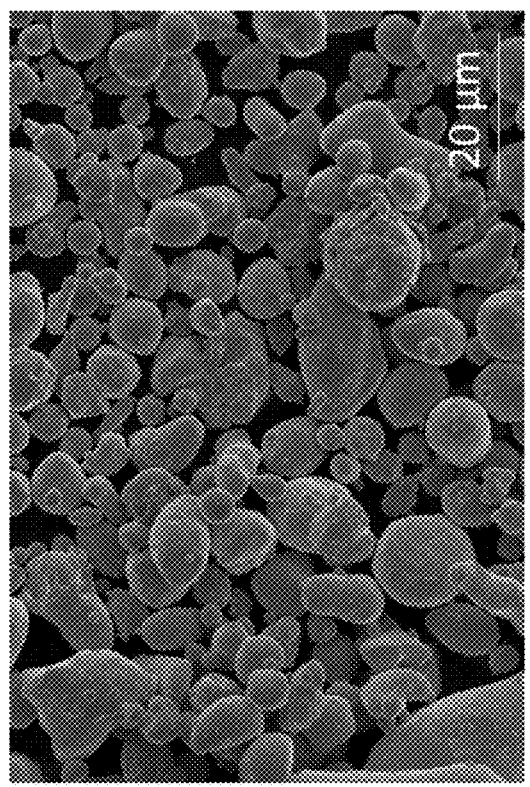

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the embodiments described herein and the elements shown in the drawings is just a most preferred embodiment of the present disclosure, but not intended to fully describe the technical aspects of the present disclosure, so it should be understood that other equivalents and modifications could have been made thereto at the time the application was filed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "essentially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

"A and/or B" when used in this specification, specifies "either A or B or both".

The present disclosure relates to electrodes and electrode material, cells and batteries comprising the same, and the manufacturing thereof.

The present disclosure is directed to the invention high energy density sodium-based batteries. The present disclosure is directed to, for example, to batteries for electric vehicles, portable devices, and stationary energy storage devices.

For example, a sodium ion secondary battery can use a variety of positive electrode materials such as sodium transition metal oxide, sodium transition metal polyanionic oxide or ferrocyanide positive electrode active material. For example, a sodium ion secondary battery can use a variety of negative electrode materials such as a hard carbon-based negative electrode active material. For example, a sodium ion secondary battery can use a variety of electrolytes, e.g., in liquid or solid form, such as an organic liquid electrolyte to ensure sodium ionic conductivity between the positive electrode and the negative electrode.

In some embodiments, a relatively higher capacity negative electrode active material can be possible, such as tin (Sn) as an alternative to the hard carbon-based negative electrode active material. For example, Tin (Sn) has high electrical conductivity and exhibits higher capacity characteristics than the hard carbon-based active material, additionally, it has a much higher density compared to carbon.

So, when tin (Sn) is applied as the negative electrode active material, it is possible to achieve relatively higher battery capacity and relatively smaller battery size than the existing batteries including the hard carbon-based negative electrode.

Tin (Sn) may exhibit a low first cycle reversible coulombic efficiency. Tin (Sn) may exhibit lower capacity retention as it is continuously charged and discharged during battery operation. This is a consequence of its continuous consumption of sodium reservoir, along with the multiple phase changes in its crystal structure during charge and discharge, resulting in the reduced battery capacity. Similar to its lithium analogous counterpart, silicon alloys that undergo large volume expansion during lithium-silicon alloy formation, the sodium-tin alloy also undergoes transition from one crystalline phase to another, resulting in even larger volume changes and poorer reversibility. In some embodiments, in lithium systems, volume change and poor reversibility may be mitigated by adopting various morphological modifications to the silicon alloy, such as using silicon nano-sized particles, or nano-sized wires. It may be possible that nano-sized silicon avoids the particle pulverization effects experienced during repeated volume change cycles during battery operation. Using nano-sized silicon particles may have significantly improved its reversibility. To mitigate the 1st cycle capacity losses, prelithiation can also be used. Combined, these strategies can result in the successful commercialization of lithium silicon alloy anodes in recent lithium-based energy storage devices.

In some embodiments, to enable similar high energy anodes in sodium secondary batteries, tin nano-sized particles may be implemented. For example, it may emulate strategies adopted in lithium. However, these efforts were unsuccessful in sodium systems to date.

There can be reasons why such strategies are unsuccessful in sodium anodes. One possible explanation is due to the high reactivity and reaction kinetics of sodium compared to lithium. As a result, the significant increase in surface area of using nanoparticles causes large amounts of unwanted side reactions to occur at each exposed surface in sodium systems compared to lithium systems, making particle size reduction ineffective in sodium alloy systems Thus, there are relatively few reports on Sn based anodes in the sodium battery literature.

The present disclosure is directed to providing a sodium secondary battery using tin (Sn) as a negative electrode active material, that overcomes the existing challenges faced in the prior art by using a critical particle size range. Contrary to conventional understanding, the tin (Sn) negative electrode is enabled in the present disclosure, for example, by increasing its particle size compared to reducing toward nano-sized ranges. Additionally, the present disclosure is further directed to providing a sodium secondary battery having good electrochemical properties including stability toward electrolytes, high capacity utilization, energy density, life characteristics and coulombic efficiency. It will be readily appreciated that these and other objects and advantages of the present disclosure may be realized by means or methods described in the appended claims and a combination thereof.

The present disclosure relates to a sodium secondary battery, and the battery comprises a negative electrode, a positive electrode and an electrolyte that provides ionic transport pathway between the negative electrode and the positive electrode. In some embodiments, the negative electrode can comprise a negative electrode active material layer comprising tin (Sn) as a negative electrode active material. In some embodiments, the negative electrode active material layer can comprise the tin (Sn) in an amount of 1 wt % or more based on 100 wt % of the negative electrode active material layer by weight. In some embodiments, the electrolyte can comprise a solid state or liquid state electrolyte. In some embodiments, the negative electrode active material layer may contain other materials such as carbon or carbon-based materials, which may include but not limited to carbon, hard-carbon, carbon fiber, graphene, carbon nanotube, conductive carbon, etc. In some embodiments, the negative electrode active material layer may contain other materials such as additives or binders in a composite with the negative electrode active materials.

The present disclosure relates to the sodium secondary battery in the first aspect wherein the negative electrode active material layer comprises the tin (Sn). In some embodiments, tin (Sn) may have an average particle size (e.g., average particle diameter) between 15 μm and 70 μm.

The present disclosure relates to the sodium secondary battery. In some embodiments, the negative electrode may comprise a current collector, and the negative electrode active material layer is formed on at least one surface of the current collector.

In some embodiments, the negative electrode active material layer can be formed on the current collector and can exhibit an electronic conductivity of between ~$10^{-5}$ to $10^0$ S $cm^{-1}$.

In some embodiments, the electrolyte can be sodium-based. In some embodiments, the electrolyte can comprise at least one selected from a solid or liquid material, such as solid borohydride material ($Na_2B_{10}H_{10}$, $Na_2B_{12}H_{12}$, $NaCB_{11}H_{12}$), or solid halide-based solid electrolyte ($Na_xM_y$-$Cl_z$, where M is one or more dopants), or liquid ether based electrolyte ($NaPF_6$ and/or $NaBF_4$ in Dimethoxyethane, Diethylene glycol dimethyl or Tetraethylene glycol dimethyl ether), or liquid carbonate based electrolyte ($NaPF_6$ and/or $NaBF_4$ in Ethylene carbonate and Dimethyl carbonate).

In some embodiments, the negative electrode active material sodium tin (Sn) can contain sodium (Na) or sodium tin (Na—Sn), for example, prior to cell operation.

In some embodiments, the negative electrode active material tin (Sn) has a metal purity of at least about 95%.

In some embodiments, the negative electrode material layer can further comprise at least one of a binder resin, a conductive carbon additive material or a solid electrolyte.

In some embodiments, the negative electrode material layer can further comprise at least one other active material, such as hard carbon.

In some embodiments, the positive electrode can comprise a positive electrode active material layer. In some embodiments, the positive electrode active material layer can comprise a variety of materials as a positive electrode active material, which may include but not limited to sodium transition metal oxide, sodium transition metal polyanionic oxide or sodium ferrocyanide. In some embodiments, the positive electrode active material layer can comprise a variety of materials such as a transition metal. In some embodiments, the transition metal can comprise at least one of Ni, Cr, Mn, Fe or V.

In some embodiments, the positive electrode active material layer further comprises at least one of a binder resin, a conductive material or a solid electrolyte.

In some embodiments, the battery may have a negative electrode capacity to positive electrode capacity (N/P) ratio of from about 0.1 to about 30.0.

The present disclosure relates to a sodium secondary battery comprising a solid or liquid electrolyte material as an electrolyte. Specific examples of the sodium secondary battery include any type of primary battery, secondary battery, fuel cell, solar cell or capacitor such as a super capacitor. In particular, the secondary battery is, to be specific, a sodium ion secondary battery.

In some embodiments, the sodium secondary battery may comprise a negative electrode, a positive electrode and a solid/liquid electrolyte connected between the negative electrode and the positive electrode. In some embodiments, the negative electrode may comprise a negative electrode active material layer including tin (Sn) as a negative electrode active material.

When hard carbon is used for the negative electrode, the life characteristics are relatively long, but volumetric energy density can be low due to the low density and low specific capacity (300 mAh/g) of carbon-based materials, resulting in less competitiveness for sodium secondary batteries. When tin is used for the negative electrode, the volumetric energy density is high density of tin compared to carbon, along with its higher specific capacities (847 mAh/g). Life characteristics can be relatively lower or shorter with tin due to multiple phase transitions and continuous sodium inventory consumption due to the large volume changes occurring during cell operation. The present disclosure relates to solving the above-described possible limitations with tin (Sn).

Hereinafter, the configuration and effect of the present disclosure will be described in detail.

In some embodiments, the tin (Sn) particle may have an average diameter of 5 μm to 70 μm, and preferably 5 μm to 25 μm. Within the above-described range, it can contribute in terms of rate capability, performance, negative electrode manufacturing.

In some embodiments, the negative electrode active material layer may include the tin (Sn) in an amount of 1 wt % or more, based on 100 wt % of the negative electrode active material layer. In some embodiments, it may be used in a composite with hard carbon, which serves both as an active material and conductive additive, along with a binder. When the average particle sizes satisfy the above-described range, it can contribute in terms of rate capability and capacity retention.

In some embodiments, it can be that the negative electrode active material layer has no conductive material, e.g., when a solid electrolyte is used. In some embodiments, it can be that the negative electrode active material layer has conductive material when a liquid electrolyte is used. In some embodiments, as the solid electrolyte does not wet the pores within the active material layer, the active material layer acts as 2D negative electrode, in which conductive carbon does not play a role. Additionally, for the same reason, in some embodiments, when a solid electrolyte is used, the negative electrode active material layer can comprise no solid electrolyte. In some embodiments, when a liquid electrolyte is used, the active material layer can act as a 3D negative electrode, and, inclusion of conductive carbon or a carbon-based material, such as carbon nanotubes, carbon fibers, hard carbon, graphene, other carbon-based material, or any combination thereof, may contribute to a property or performance of the battery in some embodiments. Additionally, in some embodiments, when a liquid electrolyte is used, the active material layer may contain both the tin (Sn) as well as hard carbon, to serve as both a conductive additive and an active material at the same time.

In some embodiments, the negative electrode active material layer may include tin (Sn) alone or substantially tin (Sn) alone. In some embodiments, the negative electrode active material layer may include tin (Sn) in combination with another material such as a binder resin. For example, the binder resin may be included in an amount of less than 10 wt %, based on 100 wt % of the negative electrode active material layer.

In some embodiments, the negative electrode may comprise a negative electrode current collector. In some embodiments, the negative electrode active material layer may be formed on at least one surface of the current collector. In some embodiments, the negative electrode active material layer may range from about 10 μm to 200 μm, and preferably, may be formed with the thickness of 10 μm to 70 μm or more preferably 10 μm to 50 μm.

In some embodiments, the structural and electrochemical property of the negative electrode active material layer, such as the average particle size, electrode mechanical integrity and electronic conductivity after water based solvent processing used in manufacturing should be retained and uncontaminated. In some embodiments, a neutral de-ionized water solvent can be used to prevent corrosion of the tin metal particles during dispersion. In some embodiments, a dry process can be kept under 200° C. to prevent further surface oxidation of the tin particles.

In some embodiments, the large particle size nature of the negative electrode active material layer has a technical significance in improving the mechanical properties and electrochemical performance of the negative electrode according to the present disclosure.

In some embodiments, the structural integrity of the particle itself is retained throughout cell cycling as a result of this invention.

In some embodiments, the negative electrode active material layer may be manufactured, for example, by the following method.

In some embodiments, the negative electrode active material layer may be obtained by dispersing tin (Sn) powder in a water solvent to prepare a slurry, subsequently applying the slurry to an appropriate negative electrode current collector and drying. The solvent may further comprise another active material, a conductive carbon material and a binder resin, where the amount of the binder resin may be adjusted to an amount of less than about 10 wt %, based on 100 wt % of the finally obtained negative electrode active material layer.

The solvent may include, for example, water, but is not particularly limited thereto, and may include any common processing organic solvent.

In some embodiments, for a fabricated tin (Sn) active material layer, the layer can be reduced using a solution of sodium containing organic salts. In some embodiments, this can only be successfully done if tin (Sn) of larger particle sizes is used, where smaller particle sized tin (Sn) will result in mechanical failure and an unusable electrode.

In some embodiments, when a solid electrolyte is used, the solid electrolyte membrane may comprise a borohydride-based solid electrolyte. In some embodiments, the borohydride-based solid electrolyte may contain sodium (Na), carbon (C), boron (B), hydrogen (H), or any combination thereof. In some embodiments, the ionic conductivity of from about 0.1 to about 20 mS cm$^{-1}$, and may comprise $Na_2B_{10}H_{12}$, $Na_2B_{12}H_{12}$, $NaCB_{11}H_{12}$ or other borohydride-based solid electrolyte materials.

In some embodiments, the average particle size of the solid electrolyte may be adjusted to an appropriate range for a sodium secondary battery. For example, the solid electrolyte may have an average particle size of from about 0.1 μm to about 50 μm. Additionally, in some embodiments, the selected solid electrolyte may have ionic conductivity of 1 mS/cm, preferably 1 mS/cm or more.

In some embodiments, the solid electrolyte membrane may be manufactured, for example, by the following method.

First, a solid electrolyte is prepared. The solid electrolyte may be prepared by obtaining from commercially available products or manufacturing by the following method. The solid electrolyte may be manufactured by the following method. First, $Na_2B_{10}H_{12}$, $Na_2B_{12}H_{12}$, $NaCB_{11}H_{12}$ or other borohydride-based solid electrolyte materials are mixed in stoichiometric amounts, and ball milled by a planetary ball milling method to obtain a homogenous mixture.

Subsequently, the solid electrolyte material is added to a predetermined organic solvent and dispersed to prepare a slurry, the slurry is applied to a release plate dried to form a sheet shape. If necessary, the result of the sheet shape may be pressed to obtain a solid electrolyte membrane.

If a liquid electrolyte is used, the liquid electrolyte comprises an ether-based liquid electrolyte. The ether based liquid electrolyte may contain a sodium salt $NaPF_6$ and/or NaBF4, along with a solvent monoglyme, diglyme or triglyme, and have the ionic conductivity of from about 0.1 to about 100 mS cm$^{-1}$, and may comprise liquid additives.

In some embodiments, the liquid electrolyte would be soaked in a polyolefin or glass fiber porous separator may be applied by drop casting the liquid electrolyte onto the polyolefin or glass fiber porous separator.

In some embodiments, the positive electrode may comprise a positive electrode active material layer comprising a positive electrode active material, a positive electrode conductive material and may contain a solid electrolyte. The positive electrode active material layer may further comprise a binder resin for the positive electrode if necessary. Additionally, the positive electrode comprises a current collector if necessary, and the positive electrode active material layer may be positioned on at least one surface of the current collector.

In some embodiments, the positive electrode active material may comprise at least one of sodium chromium oxide ($NaCrO_2$), sodium manganese ferrocyanide ($Na_2MnFe(CN)_6$), sodium iron ferrocyanide ($Na_2Fe_2(CN)_6$), sodium vanadium phosphate (($Na_3V_2(PO_4)_3$), sodium vanadium fluorophosphate (($Na_3V_2(PO_4)2F_3$), sodium nickel iron manganese oxide $Na(Ni_{1/3}Fe_{1/3}Mn_{1/3})O_2$, sodium iron manganese oxide $Na_{2/3}(Fe_{1/2}Mn_{1/2})O_2$, sodium nickel manganese oxide $NaNi_{0.5}Mn_{1.5}O_4$.

In some embodiments, the representative positive electrode active material may comprise sodium vanadium phosphate (($Na_3V_2(PO_4)_3$) and sodium nickel iron manganese oxide $Na(Ni_{1/3}Fe_{1/3}Mn_{1/3})O_2$. The invention can also be paired with any other positive electrode active material.

In a particular embodiment of the present disclosure, the positive electrode conductive material may be, for example, at least one conductive material selected from the group consisting of graphite, carbon black, carbon fibers or metal fibers, carbon nano tubes, metal powder, conductive whiskers, conductive metal oxide, activated carbon or polyphenylene derivatives. More specifically, the positive electrode conductive material may be at least one conductive material selected from the group consisting of natural graphite, artificial graphite, super-p, acetylene black, ketjen black, carbon nanotubes, carbon fibers or metal fibers, channel black, furnace black, lamp black, thermal black, denka black.

The current collector is not limited to a particular type and may include those having high electrical conductivity without causing a chemical change in the corresponding battery, for example, stainless steel, copper, aluminum, nickel, titanium, sintered carbon, or aluminum or stainless steel treated with carbon, nickel, titanium and silver on the surface.

The positive electrode binder resin may include polymer for electrode commonly used in the technical field. Non-limiting examples of the binder resin may include, but are not limited to, polyvinylidene difluoride, polyvinylidene fluoride-co-hexafluoropropylene, styrene-butadiene rubber, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

In some embodiments, the positive electrode active material is preferably included in the positive electrode in an amount of 30 wt % or more based on 100 wt % of the positive electrode active material layer. Additionally, if a solid electrolyte is used, the solid electrolyte is preferably included in the positive electrode in an amount of 10 wt % to 70 wt % based on 100 wt % of the positive electrode active material layer.

Meanwhile, in a particular embodiment of the present disclosure, the positive electrode active material layer may be obtained by adding the positive electrode active material composite to an appropriate solvent to prepare a slurry and casting the slurry, or may be obtained by a manufacturing method according to a dry mixing process without a solvent.

The method of manufacturing the positive electrode active material layer by the dry mixing method may be described, for example, as below. First, the positive electrode materials comprising the positive electrode active material, the conductive material and the binder resin are put into a mixing device and mixed by a mechanical method to obtain a mixture. The mixing device includes any type of device that can form a comparatively homogeneous mixture phase such as a well-known mixer agitator, and is not limited to a particular type of device. Meanwhile, in some embodiments, to improve the dispersion of solids and induce the fibrous form of the binder resin in the mixing process, a temperature rising process may be included. In the temperature rising process, the temperature may be appropriately controlled in the range of about 30° C. to 100° C. Subsequently, the positive electrode active material layer may be formed by extracting the mixture into the shape of an electrode (a wide film shape) using an extruder, and adjusting the thickness through a pressing process. The positive electrode active material layer may be applied to the electrode with no current collector, or if necessary, the current collector may be attached to the obtained positive electrode active material layer to the positive electrode including the current collector.

Meanwhile, in some embodiments, the sodium secondary battery according to the present disclosure may be manufactured, for example, by the following method. As described above, the negative electrode, and the positive electrode are prepared, and a solid electrolyte membrane or liquid electrolyte-soaked porous separator is sandwiched between them.

Meanwhile, in a particular embodiment of the present disclosure, the battery according to the present disclosure may have the NP ratio ranging from about 0.1 to about 30. Within the above-described range of NP ratio, stable and constant electrical and chemical properties are provided.

The NP ratio may range, for example, from about 0.5 to about 10, from about 0.8 to about 10, from about 1.0 to about 10, or from about 1.0 to about 5, and the NP ratio ranging from about 1.0 to about 1.5 can contribute in terms of battery energy density.

The secondary battery according to the present disclosure does not comprise metallic tin (Sn) with an average particle size smaller than 1 μm in the negative electrode active material layer. The large >5 μm average particle size composite provides a robust mechanical structure to mitigate the negative effects of volume change and improve electrochemical performance, while enabling ease of processability during the vital pre-sodiation process. As a result, the sodium secondary battery according to the present disclosure can solve the capacity degradation and cycle life reduction problems occurring in the battery using existing tin anodes.

Non-Limiting Example Technical Effects

The sodium secondary battery according to the present disclosure has a relatively high energy density due to the use of the dense negative electrode active material tin (Sn) in the negative electrode, this is attributed to its high capacity utilization of more than 95% of its theoretical capacity. Additionally, the negative electrode exhibits a substantially high-rate capability, able to perform fast charging rates not achievable by conventional hard carbon anodes or nanoparticle sized tin (Sn). These can be attributed to the unique properties of the large tin particle sizes. The relatively large particle sizes of tin (Sn) used such as the average diameters disclosed in the present disclosure also improves the mechanical property of the composite electrolyte and reduces the amount of inactive materials such as insulative binder required during processing. Moreover, the large particle sizes of tin (Sn) in the electrode does not experience the negative effects of volume change and large amounts of unwanted side reactions typically seen in silicon-based anodes. Additionally, the tin (Sn) material is intrinsically stable in ambient air, allowing its safe processability without need for inert environments. In some embodiments, the increased bulk density of the tin reduces the volume of slurry required during manufacturing, which can lower energy and capital costs to produce battery units. In some embodiments, the hydrophilic nature of tin lowers dispersion time during slurry mixing compared to hydrophilic carbon anodes that is subject to relatively more extensive mixing conditions to achieve a homogenous slurry suspension. In some embodiments, the low thickness of the dense tin anode casted on the current collect can reduce the temperature and drying time needed during processing. In some embodiments, to minimize volume change in the Z-axis, porosity can be controlled during calendaring to allow volume expansion into the pores instead of the Z-direction, minimizing impact on the cell architecture. The sodium tin can be formed within the cell during the cell formation step, preventing its exposure to air, which is necessary to simplify the manufacturing process. With these features, the battery according to the present disclosure has good reversibility and electrochemical properties including high charge rate capability, high energy density, long durability and high coulombic efficiency.

NON-LIMITING EMBODIMENTS

The following Examples are detailed by way of illustration only and are not to be construed as limiting in spirit or in scope, many modifications both in materials and in methods will be apparent to those skilled in the art.

Embodiment 1. An electrode composite material comprising:
a plurality of particles comprising tin (Sn), the plurality of particles having an average particle diameter of from about 1 μm to about 200 μm.

Embodiment 2. An electrode composite material comprising:
a plurality of particles comprising tin (Sn), the plurality of particles having a mass density from about 1 g/cm$^3$ to about 8 g/cm$^3$,
wherein the plurality of particles optionally has an average particle diameter of from about 1 μm to about 200 μm.

Embodiment 3. The electrode composite material of Embodiment 1-2, wherein the plurality of particles has an average particle diameter of about 150 μm or less.

Embodiment 4. The electrode composite material of Embodiment 1-2, wherein the plurality of particles has an average particle diameter of about 120 μm or less.

Embodiment 5. The electrode composite material of Embodiment 1-2, wherein the plurality of particles has an average particle diameter of about 100 μm or less.

Embodiment 6. The electrode composite material of Embodiment 1-2, wherein the plurality of particles has an average particle diameter of about 90 μm or less.

Embodiment 7. The electrode composite material of Embodiment 1-2, wherein the plurality of particles has an average particle diameter of about 80 μm or less.

Embodiment 8. The electrode composite material of Embodiment 1-2, wherein the plurality of particles has an average particle diameter of about 75 μm or less.

Embodiment 9. The electrode composite material of Embodiment 1-2, wherein the plurality of particles has an average particle diameter of about 70 μm or less.

Embodiment 10. The electrode composite material of Embodiment 1-2, wherein the plurality of particles has an average particle diameter of about 65 μm or less.

Embodiment 11. The electrode composite material of Embodiment 1-2, wherein the plurality of particles has an average particle diameter of about 60 μm or less.

Embodiment 12. The electrode composite material of Embodiment 1-2, wherein the plurality of particles has an average particle diameter of about 55 μm or less.

Embodiment 13. The electrode composite material of Embodiment 1-2, wherein the plurality of particles has an average particle diameter of about 50 μm or less.

Embodiment 14. The electrode composite material of Embodiment 1-2, wherein the plurality of particles has an average particle diameter of from about 1 μm to about 100 μm.

Embodiment 15. The electrode composite material of Embodiment 1-2, wherein the plurality of particles has an average particle diameter of from about 3 μm to about 90 μm.

Embodiment 16. The electrode composite material of Embodiment 1-2, wherein the plurality of particles has an average particle diameter of from about 3 μm to about 80 μm.

Embodiment 17. The electrode composite material of Embodiment 1-2, wherein the plurality of particles has an average particle diameter of from about 3 μm to about 75 μm.

Embodiment 18. The electrode composite material of Embodiment 1-2, wherein the plurality of particles has an average particle diameter of from about 3 μm to about 70 μm.

Embodiment 19. The electrode composite material of Embodiment 1-2, wherein the plurality of particles has an average particle diameter of from about 5 μm to about 70 μm.

Embodiment 20. The electrode composite material of Embodiment 1-2, wherein the plurality of particles has an average particle diameter of from about 5 μm to about 70 μm.

Embodiment 21. The electrode composite material of Embodiment 1-2, wherein the plurality of particles has an average particle diameter of from about 5 μm to about 65 μm.

Embodiment 22. The electrode composite material of Embodiment 1-2, wherein the plurality of particles has an average particle diameter of from about 5 μm to about 60 μm.

Embodiment 23. The electrode composite material of Embodiment 1-2, wherein the plurality of particles has an average particle diameter of from about 5 μm to about 55 μm.

Embodiment 24. The electrode composite material of Embodiment 1-2, wherein the plurality of particles has an average particle diameter of from about 5 μm to about 50 μm.

Embodiment 25. The electrode composite material of Embodiment 1-2, wherein the plurality of particles has an average particle diameter of from about 1 μm to about 20 μm.

Embodiment 26. The electrode composite material of Embodiment 1-2, wherein the plurality of particles has an average particle diameter of from about 2 μm to about 15 μm.

Embodiment 27. The electrode composite material of Embodiment 1-2, wherein the plurality of particles has an average particle diameter of from about 3 μm to about 10 μm.

Embodiment 28. The electrode composite material of Embodiment 1-2, wherein the plurality of particles has an average particle diameter of from about 4 μm to about 6 μm.

Embodiment 29. The electrode composite material of Embodiment 1-2, wherein the plurality of particles has an average particle diameter of from about 20 μm to about 200 μm.

Embodiment 30. The electrode composite material of Embodiment 1-2, wherein the plurality of particles has an average particle diameter of from about 20 μm to about 150 μm.

Embodiment 31. The electrode composite material of Embodiment 1-2, wherein the plurality of particles has an average particle diameter of from about 25 μm to about 105 μm.

Embodiment 32. The electrode composite material of Embodiment 1-2, wherein the plurality of particles has an average particle diameter of from about 30 μm to about 90 μm.

Embodiment 33. The electrode composite material of Embodiment 1-2, wherein the plurality of particles has an average particle diameter of from about 35 μm to about 75 μm.

Embodiment 34. The electrode composite material of Embodiment 1-2, wherein the plurality of particles has an average particle diameter of from about 40 μm to about 60 μm.

Embodiment 35. The electrode composite material of Embodiment 1-2, wherein the plurality of particles has an average particle diameter of from about 45 μm to about 55 μm.

Embodiment 36. The electrode composite material of Embodiment 1-35, wherein the plurality of particles has a mass density from about 2 $g/cm^3$ to about 8 $g/cm^3$.

Embodiment 37. The electrode composite material of Embodiment 1-35, wherein the plurality of particles has a mass density from about 3 $g/cm^3$ to about 7.5 $g/cm^3$.

Embodiment 38. The electrode composite material of Embodiment 1-35, wherein the plurality of particles has a mass density from about 3.5 $g/cm^3$ to about 7.3 $g/cm^3$.

Embodiment 39. The electrode composite material of Embodiment 1-35, wherein the plurality of particles has a mass density from about 4 $g/cm^3$ to about 7.2 $g/cm^3$.

Embodiment 40. The electrode composite material of Embodiment 1-39, wherein the plurality of particles is collected by electric current to form the composition material.

Embodiment 41. The electrode composite material of Embodiment 1-40, wherein the plurality of particles is casted to form the composition material.

Embodiment 42. The electrode composite material of Embodiment 1-41, comprising at least about 1 wt % of the plurality of particles.

Embodiment 43. The electrode composite material of Embodiment 1-41, comprising at least about 10 wt % of the plurality of particles.

Embodiment 44. The electrode composite material of Embodiment 1-41, comprising at least about 50 wt % of the plurality of particles.

Embodiment 45. The electrode composite material of Embodiment 1-41, comprising at least about 70 wt % of the plurality of particles.

Embodiment 46. The electrode composite material of Embodiment 1-41, comprising at least about 80 wt % of the plurality of particles.

Embodiment 47. The electrode composite material of Embodiment 1-41, comprising at least about 90 wt % of the plurality of particles.

Embodiment 48. The electrode composite material of Embodiment 1-41, comprising at least about 95 wt % of the plurality of particles.

Embodiment 49. The electrode composite material of Embodiment 1-48, further comprising a conductive material.

Embodiment 50. The electrode composite material of Embodiment 1-49, further comprising carbon or a carbon-based material.

Embodiment 51. The electrode composite material of Embodiment 1-49, further comprising hard carbon.

Embodiment 52. The electrode composite material of Embodiment 1-49, further comprising carbon nano tube or carbon fiber.

Embodiment 53. The electrode composite material of Embodiment 1-49, further comprising a binder resin.

Embodiment 54. The electrode composite material of Embodiment 1-49, further comprising a sodium (Na).

Embodiment 55. The electrode composite material of Embodiment 1-54, further comprising a sodium tin.

Embodiment 56. The electrode composite material of Embodiment 55, wherein the sodium tin is $Na_x$—Sn, wherein x is about 5.5 or less.

Embodiment 57. The electrode composite material of Embodiment 56, wherein x is about 5 or less.

Embodiment 58. The electrode composite material of Embodiment 56, wherein x is about 4.5 or less.

Embodiment 59. The electrode composite material of Embodiment 56, wherein x is about 4.0 or less.

Embodiment 60. The electrode composite material of Embodiment 56, wherein x is about 3.75 or less.

Embodiment 61. The electrode composite material of Embodiment 56, wherein x is about 3.5 or less.

Embodiment 62. The electrode composite material of Embodiment 56, wherein x is from about 0.05 to about 5.5.

Embodiment 63. The electrode composite material of Embodiment 56, wherein x is from about 0.1 to about 5.5.

Embodiment 64. The electrode composite material of Embodiment 56, wherein x is from about 0.1 to about 4.

Embodiment 65. The electrode composite material of Embodiment 56, wherein x is from about 0.1 to about 3.75.

Embodiment 66. The electrode composite material of Embodiment 1-48, wherein the plurality of particles essentially consists of Sn.

Embodiment 67. The electrode composite material of Embodiment 1-48, wherein the plurality of particles consists of Sn.

Embodiment 68. The electrode composite material of Embodiment 1-65, wherein at least some particles among the plurality of particles essentially consists of Sn.

Embodiment 69. The electrode composite material of Embodiment 1-65, wherein at least some particles among the plurality of particles consists of Sn.

Embodiment 70. The electrode composite material of Embodiment 1-69, wherein the electrode composite material exhibits an electronic conductivity of at least about $10^{-8}$ S cm$^{-1}$.

Embodiment 71. The electrode composite material of Embodiment 1-69, wherein the electrode composite material exhibits an electronic conductivity of from about $10^{-8}$ S cm$^{-1}$ to about 1000 S cm$^{-1}$.

Embodiment 72. The electrode composite material of Embodiment 1-69, wherein the electrode composite material exhibits an electronic conductivity of from about $10^{-7}$ S cm$^{-1}$ to about 100 S cm$^{-1}$.

Embodiment 73. The electrode composite material of Embodiment 1-69, wherein the electrode composite material exhibits an electronic conductivity of from about $10^{-6}$ S cm$^{-1}$ to about 50 S cm$^{-1}$.

Embodiment 74. The electrode composite material of Embodiment 1-69, wherein the electrode composite material exhibits an electronic conductivity of from about $10^{-6}$ S cm$^{-1}$ to about 40 S cm$^{-1}$.

Embodiment 75. The electrode composite material of Embodiment 1-69, wherein the electrode composite material exhibits an electronic conductivity of from about $10^{-6}$ S cm$^{-1}$ to about 30 S cm$^{-1}$.

Embodiment 76. The electrode composite material of Embodiment 1-69, wherein the electrode composite material exhibits an electronic conductivity of from about $10^{-6}$ S cm$^{-1}$ to about 20 S cm$^{-1}$.

Embodiment 77. The electrode composite material of Embodiment 1-69, wherein the electrode composite material exhibits an electronic conductivity of from about $10^{-5}$ S cm$^{-1}$ to about 10 S cm$^{-1}$.

Embodiment 78. A negative electrode comprising the electrode composite material of Embodiment 1-77.

Embodiment 79. The negative electrode of Embodiment 78, further comprising an active material layer including the electrode composite material.

Embodiment 80. The negative electrode of Embodiment 79, further comprising a current collector.

Embodiment 81. The negative electrode of Embodiment 79-80, wherein the active material layer has an average thickness of from about 1 μm to about 300 μm.

Embodiment 82. The negative electrode of Embodiment 79-80, wherein the active material layer has an average thickness of from about 2 μm to about 250 μm.

Embodiment 83. The negative electrode of Embodiment 79-80, wherein the active material layer has an average thickness of from about 3 μm to about 200 μm.

Embodiment 84. The negative electrode of Embodiment 79-80, wherein the active material layer has an average thickness of from about 4 μm to about 190 μm.

Embodiment 85. The negative electrode of Embodiment 79-80, wherein the active material layer has an average thickness of from about 5 μm to about 180 μm.

Embodiment 86. The negative electrode of Embodiment 79-80, wherein the active material layer has an average thickness of from about 5 μm to about 170 μm.

Embodiment 87. The negative electrode of Embodiment 79-80, wherein the active material layer has an average thickness of from about 5 μm to about 160 μm.

Embodiment 88. The negative electrode of Embodiment 79-80, wherein the active material layer has an average thickness of from about 5 μm to about 150 μm.

Embodiment 89. The negative electrode of Embodiment 79-80, wherein the active material layer has an average thickness of from about 5 μm to about 140 μm.

Embodiment 90. The negative electrode of Embodiment 79-80, wherein the active material layer has an average thickness of from about 5 μm to about 130 μm.

Embodiment 91. The negative electrode of Embodiment 79-80, wherein the active material layer has an average thickness of from about 5 μm to about 120 μm.

Embodiment 92. The negative electrode of Embodiment 79-80, wherein the active material layer has an average thickness of from about 5 μm to about 110 μm.

Embodiment 93. The negative electrode of Embodiment 79-80, wherein the active material layer has an average thickness of from about 5 μm to about 100 μm.

Embodiment 94. The negative electrode of Embodiment 79-80, wherein the active material layer has an average thickness of from about 5 μm to about 90 μm.

Embodiment 95. The negative electrode of Embodiment 79-80, wherein the active material layer has an average thickness of from about 5 μm to about 80 μm.

Embodiment 96. The negative electrode of Embodiment 79-80, wherein the active material layer has an average thickness of from about 5 μm to about 70 μm.

Embodiment 97. The negative electrode of Embodiment 79-80, wherein the active material layer has an average thickness of from about 5 μm to about 60 μm.

Embodiment 98. The negative electrode of Embodiment 79-80, wherein the active material layer has an average thickness of from about 5 μm to about 50 μm.

Embodiment 99. The negative electrode of Embodiment 79-80, wherein the active material layer has an average thickness of from about 10 μm to about 200 μm.

Embodiment 100. The negative electrode of Embodiment 79-80, wherein the active material layer has an average thickness of from about 10 μm to about 190 μm.

Embodiment 101. The negative electrode of Embodiment 79-80, wherein the active material layer has an average thickness of from about 10 μm to about 180 μm.

Embodiment 102. The negative electrode of Embodiment 79-80, wherein the active material layer has an average thickness of from about 10 μm to about 170 μm.

Embodiment 103. The negative electrode of Embodiment 79-80, wherein the active material layer has an average thickness of from about 10 μm to about 160 μm.

Embodiment 104. The negative electrode of Embodiment 79-80, wherein the active material layer has an average thickness of from about 10 μm to about 150 μm.

Embodiment 105. The negative electrode of Embodiment 79-80, wherein the active material layer has an average thickness of from about 10 μm to about 140 μm.

Embodiment 106. The negative electrode of Embodiment 79-80, wherein the active material layer has an average thickness of from about 10 μm to about 130 μm.

Embodiment 107. The negative electrode of Embodiment 79-80, wherein the active material layer has an average thickness of from about 10 μm to about 120 μm.

Embodiment 108. The negative electrode of Embodiment 79-80, wherein the active material layer has an average thickness of from about 10 μm to about 110 μm.

Embodiment 109. The negative electrode of Embodiment 79-80, wherein the active material layer has an average thickness of from about 10 μm to about 100 μm.

Embodiment 110. The negative electrode of Embodiment 79-80, wherein the active material layer has an average thickness of from about 10 μm to about 90 μm.

Embodiment 111. The negative electrode of Embodiment 79-80, wherein the active material layer has an average thickness of from about 10 μm to about 80 μm.

Embodiment 112. The negative electrode of Embodiment 79-80, wherein the active material layer has an average thickness of from about 10 μm to about 70 μm.

Embodiment 113. The negative electrode of Embodiment 79-80, wherein the active material layer has an average thickness of from about 10 μm to about 60 μm.

Embodiment 114. The negative electrode of Embodiment 79-80, wherein the active material layer has an average thickness of from about 10 μm to about 50 μm.

Embodiment 115. The negative electrode of Embodiment 80-114, wherein the active material layer is formed on the current collector.

Embodiment 116. The negative electrode of Embodiment 115, wherein the current collector comprises a conductive material.

Embodiment 117. The negative electrode of Embodiment 80-114, wherein the plurality of particles is bound to the current collector to form the active material layer.

Embodiment 118. The negative electrode of Embodiment 80-114, wherein the plurality of particles is collected by electric current on the current collector to form the active material layer.

Embodiment 119. The negative electrode of Embodiment 80-114, wherein the plurality of particles is casted on the current collector to form the active material layer.

Embodiment 120. The negative electrode of Embodiment 78-119, further comprising at least one other active material layer.

Embodiment 121. The negative electrode of Embodiment 78-120, wherein the plurality of particles is formed before it is incorporated into the negative electrode.

Embodiment 122. The negative electrode of Embodiment 80-121, wherein the plurality of particles is combined with a solvent to form a slurry, applied to the current collector, and dried to form the active material layer.

Embodiment 123. The negative electrode of Embodiment 122, wherein the solvent is an organic solvent.

Embodiment 124. The negative electrode of Embodiment 122-123, wherein the solvent comprises a compound selected from the group consisting of water, ethanol, isopropanol, is N-Methyl-2-pyrrolidone (NMP), xylene, toluene, hexane, heptane, isobutyl butyrate, or combinations thereof.

Embodiment 125. The negative electrode of Embodiment 122-124, wherein the solvent is xylene.

Embodiment 126. The negative electrode of Embodiment 122, wherein the solvent is a polar solvent.

Embodiment 127. The negative electrode of Embodiment 122, wherein the solvent is water.

Embodiment 128. The negative electrode of Embodiment 122, wherein the solvent is N-Methyl-2-pyrrolidone (NMP).

Embodiment 129. The negative electrode of Embodiment 122, wherein the solvent includes water.

Embodiment 130. The negative electrode of Embodiment 116-129, wherein the conductive material comprises a metal.

Embodiment 131. The negative electrode of Embodiment 116-129, wherein the conductive material comprises a material selected from the group consisting of stainless steel, copper, aluminum, nickel, titanium, sintered carbon, aluminum treated with carbon, nickel, titanium or silver, or stainless steel treated with carbon, nickel, titanium or silver, and combinations thereof.

Embodiment 132. The negative electrode of Embodiment 116-129, wherein the conductive material comprises a material selected from the group consisting of graphite, carbon black, carbon fibers or metal fibers, metal powder, conductive whiskers, conductive metal oxide, activated carbon, polyphenylene derivatives, and combinations thereof.

Embodiment 133. The negative electrode of Embodiment 116-129, wherein the conductive material comprises a material selected from the group consisting of natural graphite, artificial graphite, super-p, acetylene black, ketjen black, channel black, furnace black, lamp black, thermal black, denka black, vapor grown carbon fiber, carbon nanotubes, carbon nanofibers and combinations thereof.

Embodiment 134. The negative electrode of Embodiment 116-129, wherein the conductive material includes metal or carbon.

Embodiment 135. The negative electrode of Embodiment 122-134, wherein the slurry further comprises a binder resin.

Embodiment 136. The negative electrode of Embodiment 135, wherein the binder resin comprises a compound selected from the group consisting of styrene-butadiene rubber, carboxymethyl cellulose, sodium carboxymethyl cellulose, polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

Embodiment 137. The negative electrode of Embodiment 79-136, wherein, wherein the active material layer has a bulk density before first charge/discharge cycle of from about 1 to about 7 $g/cm^3$.

Embodiment 138. The negative electrode of Embodiment 79-137, wherein, wherein the active material layer has a bulk density before first charge/discharge cycle of from about 2 to about 7 $g/cm^3$.

Embodiment 139. The negative electrode of Embodiment 79-138, wherein the active material layer has a bulk density before first charge/discharge cycle of from about 1 g/cm³ to about 8 g/cm³.

Embodiment 140. The negative electrode of Embodiment 79-139, wherein the active material layer has a bulk density before first charge/discharge cycle of from about 2 g/cm³ to about 7.5 g/cm³.

Embodiment 141. The negative electrode of Embodiment 79-140, wherein the active material layer has a bulk density before first charge/discharge cycle of from about 3 g/cm³ to about 7.3 g/cm³.

Embodiment 142. The negative electrode of Embodiment 79-141, the active material layer has a bulk density before first charge/discharge cycle of from about 3.5 g/cm³ to about 7.2 g/cm³.

Embodiment 143. A battery comprising: a) the negative electrode of Embodiment 78-142, b) a positive electrode and c) an electrolyte comprising a solid state electrolyte or a liquid electrolyte soaked separator membrane interposed between the negative electrode and the positive electrode.

Embodiment 144. The battery of Embodiment 143, wherein the electrolyte comprises at least one solid or liquid electrolyte material selected from the group consisting of solid borohydride material ($Na_2B_{10}H_{10}$, $Na_2B_{12}H_{12}$, $NaCB_{11}H_{12}$), solid sulfide-based solid electrolyte ($Na_3PS_4$), liquid ether-based electrolyte ($NaPF_6$ in glyme, diglyme or triglyme, or other ethers), liquid carbonate based electrolyte ($NaPF_6$ in Ethylene carbonate and Dimethyl carbonate), or combination thereof.

Embodiment 145. The battery of Embodiment 143-144, wherein the positive electrode comprises a positive electrode active material layer, wherein the positive electrode active material layer comprises sodium transition metal oxide or sodium transition metal polyanionic oxide active material as a positive electrode active material and the transition metal comprises at least one of Ni, Cr, Mn, Fe or V.

Embodiment 146. The battery of Embodiment 143-144, wherein the positive electrode comprises a positive electrode active material layer, and wherein the positive electrode active material layer comprises sodium ferrocyanide positive electrode as a positive electrode active material, and the positive electrode comprises at least one of Fe or Mn.

Embodiment 147. The battery of Embodiment 143-146, wherein the positive electrode comprises a positive electrode active material layer, and wherein the positive electrode active material layer further comprises at least one of a binder resin, a conductive material or a solid electrolyte.

Embodiment 148. The battery of Embodiment 143-147, the positive electrode comprises a positive electrode active material layer, and wherein the positive electrode active material layer is obtained using a manufacturing method according to a dry mixing process without a solvent.

Embodiment 149. The battery of Embodiment 143-148, wherein the battery has an NP ratio of from about 0.1 to about 30.

Embodiment 150. The battery of Embodiment 143-148, wherein the battery has an NP ratio of from about 0.5 to about 10.

Embodiment 151. The battery of Embodiment 143-148, wherein the battery has an NP ratio of from about 0.8 to about 10.

Embodiment 152. The battery of Embodiment 143-148, wherein the battery has an NP ratio of from about 1.0 to about 10.

Embodiment 153. The battery of Embodiment 143-148, wherein the battery has an NP ratio of from about 1.0 to about 5.

Embodiment 154 The battery of Embodiment 143-148, wherein the battery has an NP ratio of from about 1.0 to about 1.5.

Embodiment 155. The battery of Embodiment 143-148, wherein the battery has a coulombic efficiency of at least about 70% for the first 12 cycles.

Embodiment 156. The battery of Embodiment 143-148, wherein the battery has a coulombic efficiency of at least about 70% for the first 8 cycles.

Embodiment 157. The battery of Embodiment 143-148, wherein the battery has a coulombic efficiency of at least about 70% for the first 6 cycles.

Embodiment 158. The battery of Embodiment 143-148, wherein the battery has a coulombic efficiency of at least about 70% for the first 4 cycles.

Embodiment 159. The battery of Embodiment 143-148, wherein the battery has a coulombic efficiency of at least about 70% for the first 2 cycles.

Embodiment 160. The battery of Embodiment 143-148, wherein the battery has a coulombic efficiency of at least about 70% for the first 20 cycles.

Embodiment 161. The battery of Embodiment 143-148, wherein the battery has a coulombic efficiency of at least about 70% for the first 30 cycles.

Embodiment 162. The battery of Embodiment 143-148, wherein the battery has a coulombic efficiency of at least about 70% for the first 40 cycles.

Embodiment 163. The battery of Embodiment 143-148, wherein the battery has a coulombic efficiency of at least about 70% for the first 50 cycles.

Embodiment 164. The battery of Embodiment 143-148, wherein the battery has a coulombic efficiency of at least about 90% for the first 20 cycles.

Embodiment 165. The battery of Embodiment 143-148, wherein the battery has a coulombic efficiency of at least about 90% for the first 30 cycles.

Embodiment 166. The battery of Embodiment 143-148, wherein the battery has a coulombic efficiency of at least about 90% for the first 40 cycles.

Embodiment 167. The battery of Embodiment 143-148, wherein the battery has a coulombic efficiency of at least about 90% for the first 50 cycles.

Embodiment 168. The battery of Embodiment 143-148, wherein the battery has a coulombic efficiency of at least about 70% for the first 60 cycles.

Embodiment 169. The battery of Embodiment 143-148, wherein the battery has a coulombic efficiency of at least about 90% for the first 70 cycles.

Embodiment 170. The battery of Embodiment 143-148, wherein the battery has a coulombic efficiency of at least about 70% for the first 80 cycles.

Embodiment 171. The battery of Embodiment 143-148, wherein the battery has a coulombic efficiency of at least about 90% for the first 90 cycles.

Embodiment 172. The battery of Embodiment 143-148, wherein the battery has a coulombic efficiency of at least about 70% for the first 100 cycles.

Embodiment 173. A negative electrode comprising:
an active material layer comprising an electrode composite material including a plurality of particles comprising tin (Sn),
wherein the active material layer has a bulk density before first charge/discharge cycle of from about 1 g/cm³ to about 8 g/cm³.

Embodiment 174. The negative electrode of Embodiment 173, wherein the negative electrode comprises:
a current collector.

Embodiment 175. The negative electrode of Embodiment 173-174, wherein the active material layer has a bulk density before first charge/discharge cycle of from about 2 g/cm$^3$ to about 8 g/cm$^3$.

Embodiment 176. The negative electrode of Embodiment 173-174, wherein the active material layer has a bulk density before first charge/discharge cycle of from about 3 g/cm$^3$ to about 8 g/cm$^3$.

Embodiment 177. The negative electrode of Embodiment 173-174, the active material layer has a bulk density before first charge/discharge cycle of from about 3.5 g/cm$^3$ to about 8 g/cm$^3$.

Embodiment 178. The negative electrode of Embodiment 173-174, wherein, wherein the active material layer has a bulk density before first charge/discharge cycle of from about 1 to 7 g/cm$^3$.

Embodiment 179. The negative electrode of Embodiment 173-174, wherein, wherein the active material layer has a bulk density before first charge/discharge cycle of from about 2 to 7 g/cm$^3$.

Embodiment 180. The negative electrode of Embodiment 173-174, wherein the active material layer has a thickness of from about 3 μm to about 200 μm.

Embodiment 181. The negative electrode of Embodiment 173-174, wherein the active material layer has a thickness of from about 4 μm to about 190 μm.

Embodiment 182. The negative electrode of Embodiment 173-174, wherein the active material layer has a thickness of from about 5 μm to about 180 μm.

Embodiment 183. The negative electrode of Embodiment 173-174, wherein the active material layer has a thickness of from about 5 μm to about 170 μm.

Embodiment 184. The negative electrode of Embodiment 173-174, wherein the active material layer has a thickness of from about 5 μm to about 160 μm.

Embodiment 185. The negative electrode of Embodiment 173-174, wherein the active material layer has a thickness of from about 5 μm to about 150 μm.

Embodiment 186. The negative electrode of Embodiment 173-174, wherein the active material layer has a thickness of from about 5 μm to about 140 μm.

Embodiment 187. The negative electrode of Embodiment 173-174, wherein the active material layer has a thickness of from about 5 μm to about 130 μm.

Embodiment 188. The negative electrode of Embodiment 173-174, wherein the active material layer has a thickness of from about 5 μm to about 120 μm.

Embodiment 189. The negative electrode of Embodiment 173-174, wherein the active material layer has a thickness of from about 5 μm to about 110 μm.

Embodiment 190. The negative electrode of Embodiment 173-174, wherein the active material layer has a thickness of from about 5 μm to about 100 μm.

Embodiment 191. The negative electrode of Embodiment 173-174, wherein the active material layer has a thickness of from about 5 μm to about 90 μm.

Embodiment 192. The negative electrode of Embodiment 173-174, wherein the active material layer has a thickness of from about 5 μm to about 80 μm.

Embodiment 193. The negative electrode of Embodiment 173-174, wherein the active material layer has a thickness of from about 5 μm to about 70 μm.

Embodiment 194. The negative electrode of Embodiment 173-174, wherein the active material layer has a thickness of from about 5 μm to about 60 μm.

Embodiment 195. The negative electrode of Embodiment 173-174, wherein the active material layer has a thickness of from about 5 μm to about 50 μm.

Embodiment 196. The negative electrode of Embodiment 173-174, wherein the active material layer has a thickness of from about 10 μm to about 200 μm.

Embodiment 197. The negative electrode of Embodiment 173-174, wherein the active material layer has a thickness of from about 10 μm to about 190 μm.

Embodiment 198. The negative electrode of Embodiment 173-174, wherein the active material layer has a thickness of from about 10 μm to about 180 μm.

Embodiment 199. The negative electrode of Embodiment 173-174, wherein the active material layer has a thickness of from about 10 μm to about 170 μm.

Embodiment 200. The negative electrode of Embodiment 173-174, wherein the active material layer has a thickness of from about 10 μm to about 160 μm.

Embodiment 201. The negative electrode of Embodiment 173-174, wherein the active material layer has a thickness of from about 10 μm to about 150 μm.

Embodiment 202. The negative electrode of Embodiment 173-174, wherein the active material layer has a thickness of from about 10 μm to about 140 μm.

Embodiment 203. The negative electrode of Embodiment 173-174, wherein the active material layer has a thickness of from about 10 μm to about 130 μm.

Embodiment 204. The negative electrode of Embodiment 173-174, wherein the active material layer has a thickness of from about 10 μm to about 120 μm.

Embodiment 205. The negative electrode of Embodiment 173-174, wherein the active material layer has a thickness of from about 10 μm to about 110 μm.

Embodiment 206. The negative electrode of Embodiment 173-174, wherein the active material layer has a thickness of from about 10 μm to about 100 μm.

Embodiment 207. The negative electrode of Embodiment 173-174, wherein the active material layer has a thickness of from about 10 μm to about 90 μm.

Embodiment 208. The negative electrode of Embodiment 173-174, wherein the active material layer has a thickness of from about 10 μm to about 80 μm.

Embodiment 209. The negative electrode of Embodiment 173-174, wherein the active material layer has a thickness of from about 10 μm to about 70 μm.

Embodiment 210. The negative electrode of Embodiment 173-174, wherein the active material layer has a thickness of from about 10 μm to about 60 μm.

Embodiment 211. The negative electrode of Embodiment 173-174, wherein the active material layer has a thickness of from about 10 μm to about 50 μm.

Embodiment 212. A battery comprising a negative electrode including a plurality of particles comprising tin (Sn), a positive electrode, and an electrolyte, wherein the battery has a negative electrode capacity to positive electrode capacity (N/P) ratio of 0.1 to 30.0.

Embodiment 213. The battery of Embodiment 212, wherein the battery has an NP ratio of 0.5 to 10.

Embodiment 214. The battery of Embodiment 212, wherein the battery has an NP ratio of 0.8 to 10.

Embodiment 215. The battery of Embodiment 212, wherein the battery has an NP ratio of 1.0 to 10.

Embodiment 216. The battery of Embodiment 212, wherein the battery has an NP ratio of 1.0 to 5.

Embodiment 217. The battery of Embodiment 212, wherein the battery has an NP ratio of 1.0 to 1.5.

Embodiment 218. The battery of Embodiment 212-217, wherein the battery has a coulombic efficiency of at least about 70% for the first 12 cycles.

Embodiment 219. The battery of Embodiment 212-217, wherein the battery has a coulombic efficiency of at least about 70% for the first 8 cycles.

Embodiment 220. The battery of Embodiment 212-217, wherein the battery has a coulombic efficiency of at least about 70% for the first 6 cycles.

Embodiment 221. The battery of Embodiment 212-217, wherein the battery has a coulombic efficiency of at least about 70% for the first 4 cycles.

Embodiment 222. The battery of Embodiment 212-217, wherein the battery has a coulombic efficiency of at least about 70% for the first 2 cycles.

Embodiment 223. The battery of Embodiment 212-217, wherein the battery has a coulombic efficiency of at least about 70% for the first 20 cycles.

Embodiment 224. The battery of Embodiment 212-217, wherein the battery has a coulombic efficiency of at least about 70% for the first 30 cycles.

Embodiment 225. The battery of Embodiment 212-217, wherein the battery has a coulombic efficiency of at least about 70% for the first 40 cycles.

Embodiment 226. The battery of Embodiment 212-217, wherein the battery has a coulombic efficiency of at least about 70% for the first 50 cycles.

Embodiment 227. The battery of Embodiment 212-217, wherein the battery has a coulombic efficiency of at least about 90% for the first 20 cycles.

Embodiment 228. The battery of Embodiment 212-217, wherein the battery has a coulombic efficiency of at least about 90% for the first 30 cycles.

Embodiment 229. The battery of Embodiment 212-217, wherein the battery has a coulombic efficiency of at least about 90% for the first 40 cycles.

Embodiment 230. The battery of Embodiment 212-217, wherein the battery has a coulombic efficiency of at least about 90% for the first 50 cycles.

Embodiment 231. The battery of Embodiment 212-217, wherein the battery has a coulombic efficiency of at least about 70% for the first 60 cycles.

Embodiment 232. The battery of Embodiment 212-217, wherein the battery has a coulombic efficiency of at least about 90% for the first 70 cycles.

Embodiment 233. The battery of Embodiment 212-217, wherein the battery has a coulombic efficiency of at least about 70% for the first 80 cycles.

Embodiment 234. The battery of Embodiment 212-217, wherein the battery has a coulombic efficiency of at least about 90% for the first 90 cycles.

Embodiment 235. The battery of Embodiment 212-217, wherein the battery has a coulombic efficiency of at least about 70% for the first 100 cycles.

NON-LIMITING EXAMPLES

The following Examples are detailed by way of illustration only and are not to be construed as limiting in spirit or in scope, many modifications both in materials and in methods will be apparent to those skilled in the art.

Example 1—Manufacturing—Particles Manufacturing Process

In some embodiments, a mixture of ball milling conditions and sieving with different mesh sizes can be used to obtain the various particle sizes. Here, tin (Sn) particles were prepared based on the following four conditions:

Condition A: The condition A particles as purchased are placed and filtered through a mesh to have average particle diameter ranging from 5 μm to 50 μm.

Condition B: The condition A particles as purchased are placed and filtered through a mesh to have average particle diameter ranging from 1 μm to 5 μm.

Condition C: The condition A particles as purchased are placed in a ball milling vessel along with the milling media and milling is performed under the following conditions: Planetary Ball milling for 300 rpm, 2 hours, 3 mm milling media. Average particle sizes ranging from 0.1 μm to 1 μm are displayed and labelled as Condition C.

FIG. 1 are microscope images showing tin (Sn) prepared under condition A. Average particle sizes ranging from 5 μm to 50 μm are displayed and labelled as condition A. Condition A is the Sn particle obtained after large mesh filtering to achieve the target particle size range.

Figure 2:
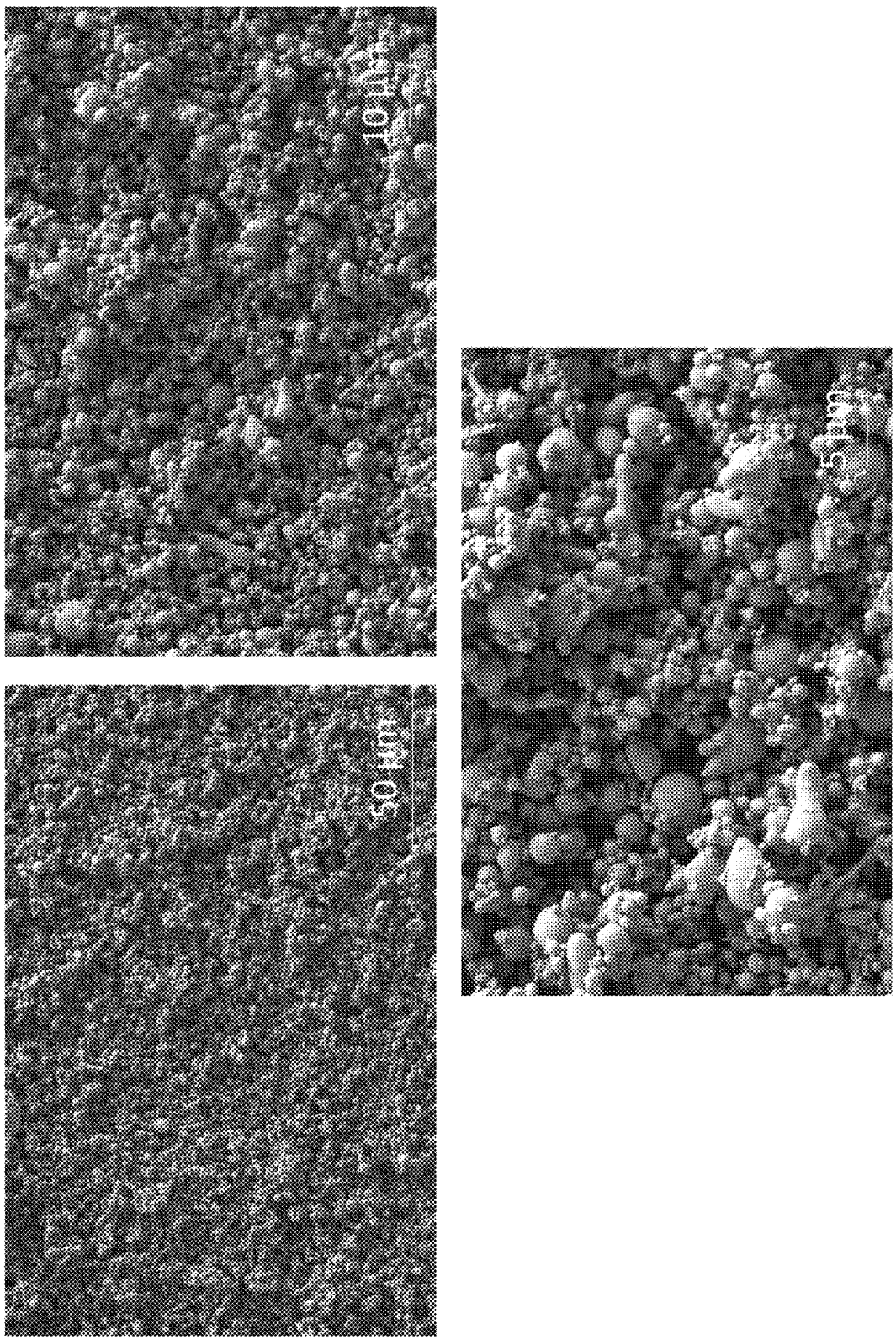
FIG. 2 are microscope images showing tin (Sn) prepared under condition B. Average particle sizes ranging from 1 μm to 5 μm are displayed and labelled as condition B in some embodiments.

FIG. 2 are microscope images showing tin (Sn) prepared under condition B. Average particle sizes ranging from 1 μm to 5 μm are displayed and labelled as condition B. Condition B is the Sn particle obtained after fine mesh filtering to achieve the target particle size range.

Figure 3:
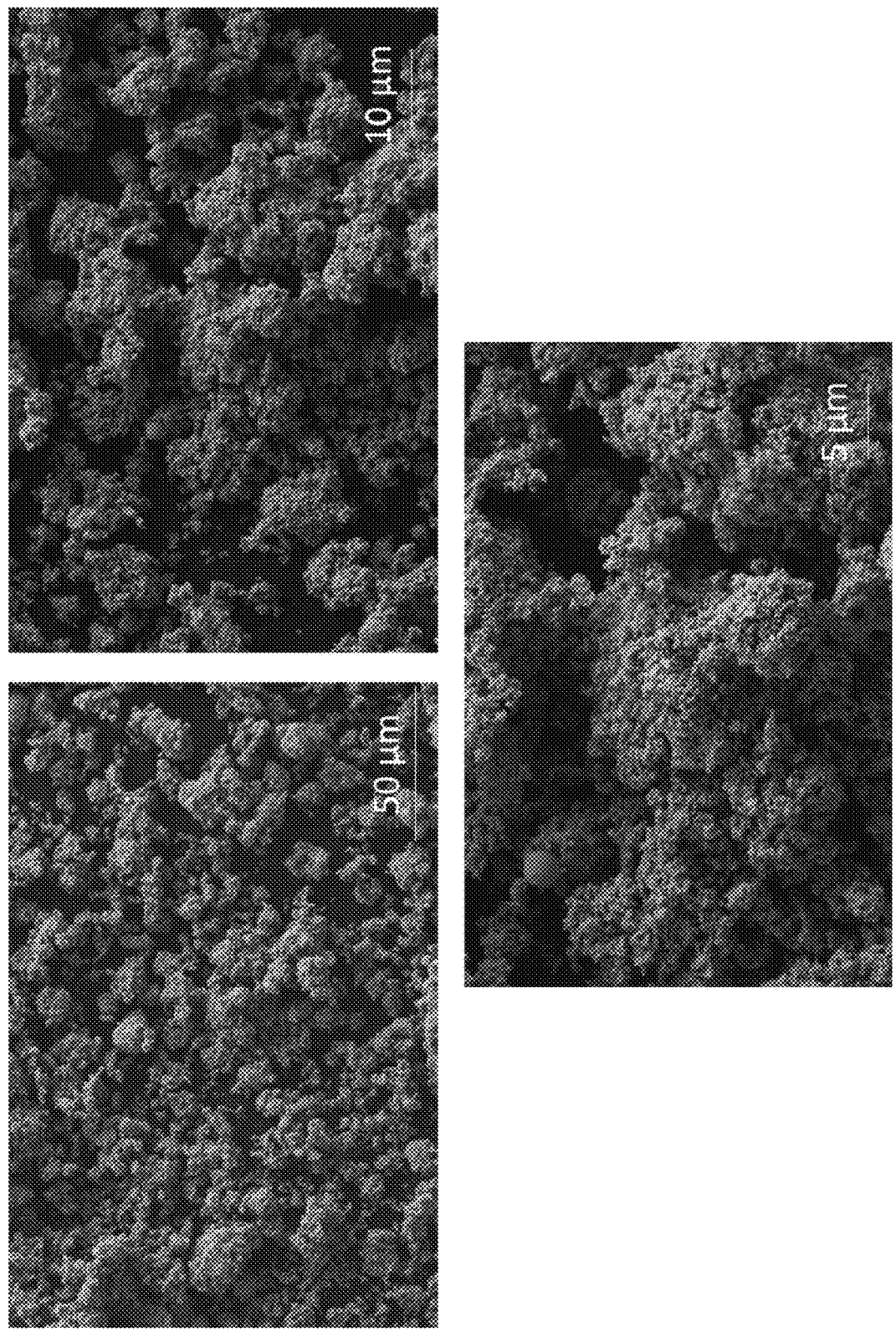
FIG. 3 are microscope images showing tin (Sn) prepared under condition C. Average particle sizes ranging from 0.1 μm to 1 μm are displayed and labelled as condition C in some embodiments.

FIG. 3 are microscope images showing tin (Sn) prepared under condition C. Average particle sizes ranging from 0.1 μm to 1 μm are displayed and labelled as condition C. Condition C is the Sn particle obtained after ball milling using a ball miller under 300 rpm for 2 hours to achieve the nano-sized particle range.

Example 2—Manufacturing—Negative Electrode Manufacturing Process

Tin from the respective conditions (A,B,C) are first dispersed in a water solvent to prepare a slurry. Conductive additives and a binder resin are also included in the slurry during the mixing step of an amount less than 10 wt % based on 100 wt % of the total negative electrode active material layer. The slurry is then cast on an aluminum current collector at a predetermined thickness during a doctor blade and dried at 90 deg C. for 2 minutes. After drying, the electrodes are calendared before being used to assemble a battery.

Figure 15:
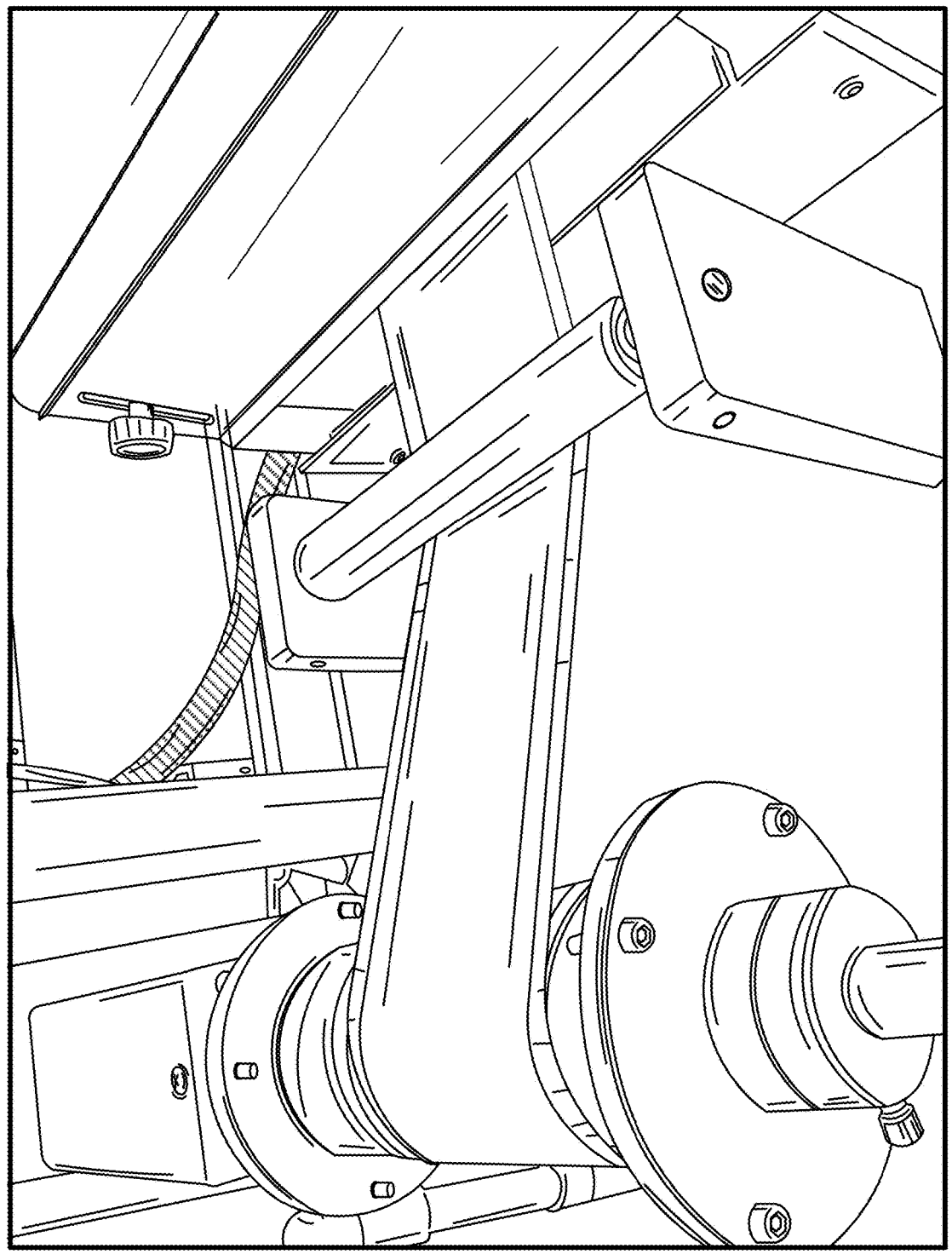
FIG. 15 are digital images of tin (Sn) negative electrode manufactured by a water-based solvent in ambient air to demonstrate its ease of manufacturing in some embodiments.

FIG. 15 is digital image of tin (Sn) negative electrode manufactured by a water-based solvent in ambient air to demonstrate its ease of manufacturing.

After the tin anode is prepared on the current collector, calendaring is done on the tin (Sn) negative electrode roll to compact the as cast tin electrode to ensure uniform thickness throughout the roll. Typical target porosity between 40 to 70% is used, and calendaring gap is set accordingly between 0 to 50 μm to achieve the target electrode porosity. A lower porosity is necessary to maximize cell energy density while a high porosity is necessary to minimize volume change and thus higher cycle life.

Figure 12:
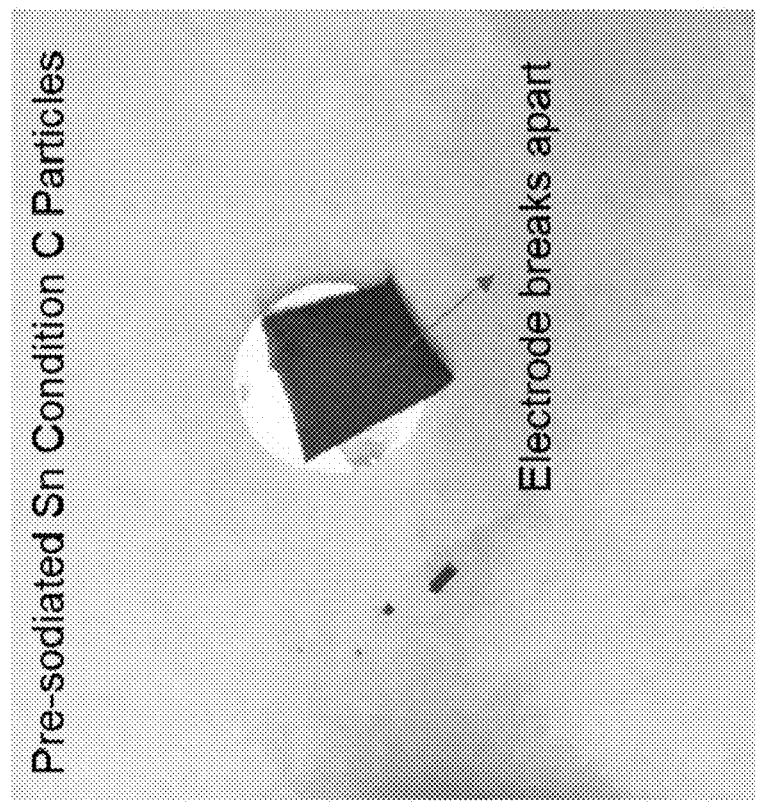
FIG. 12 shows the pictures of the pre-sodiated tin (Sn) with condition A particle size (5-50 μm), showing good mechanical integrity, vs the pictures of the pre-sodated tin (Sn) with condition C particle size (1-5 μm), showing poor mechanical integrity, resulting in an unusable electrode in a full cell in some embodiments.
Figure 12:
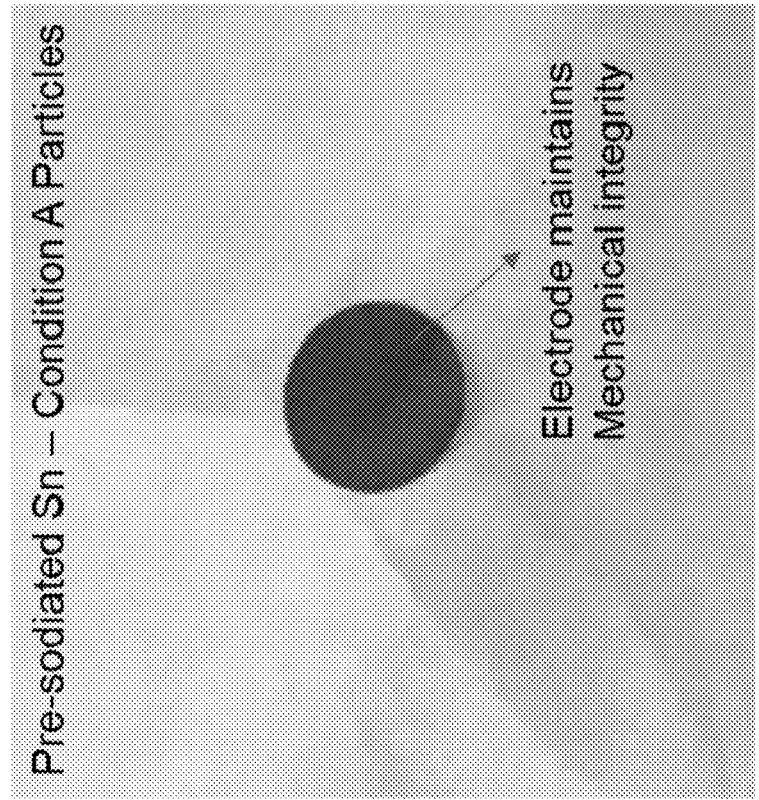

FIG. 12 shows the pictures of the tin (Sn) with condition A particle size (5-50 μm), showing good mechanical integrity, vs the pictures of the tin (Sn) with condition C particle size (<1 μm) prepared under the identical fabrication conditions, showing poor mechanical integrity, resulting in an unusable electrode in a full cell. Tin with larger particle sizes are better able to retain their mechanical properties and interparticle to current collector contact compared to smaller particle sizes with high surface area to volume ratio, which requires excessive polymeric binders to hold the particles together.

Example 3—Direct Current Polarization

Figure 4:
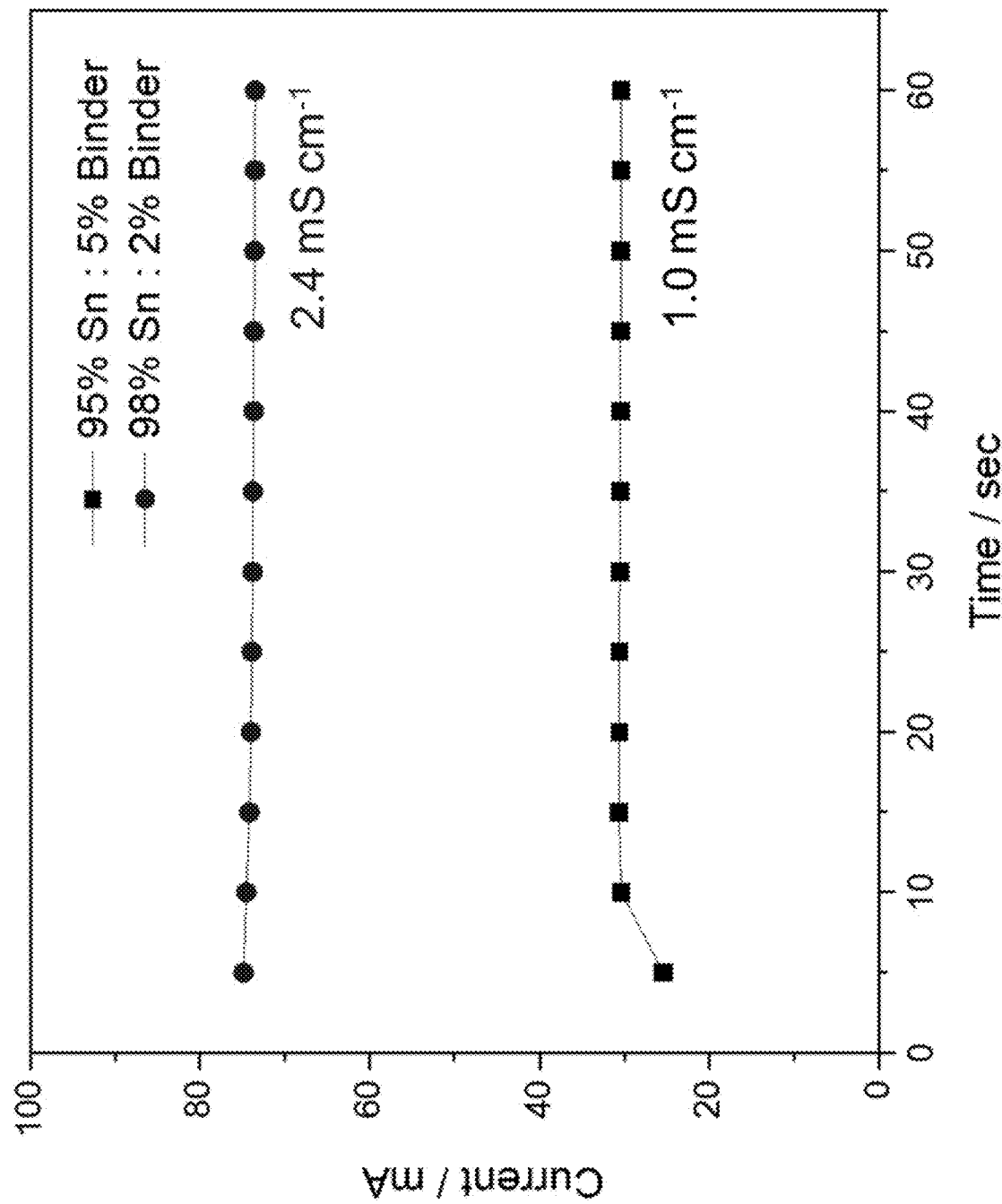
FIG. 4 shows the direct current polarization measurements of tin (Sn) of condition A particle sizes mixed with different amounts of insulative binders, along with the calculated electronic conductivities in some embodiments.

FIG. 4 shows the direct current polarization measurements of tin (Sn) of condition A particle sizes mixed with different amounts of insulative binders, along with the calculated electronic conductivities. The direct current polarization measurements are taken by first sandwiching the as-fabricated tin electrodes between two conductive titanium rods. A small constant voltage of 10 mV, 20 mV and 50 mV is then applied across the two conductive titanium rods, with a response current passing through the tin electrode measured by a potentiostat over a period of 60 seconds. The steady state current is then taken as the appropriate response current. Ohm's law is applied (R=V/I) to obtain the ohmic resistance across the tin electrodes for different constant voltages applied. To calculate the electronic conductivities, the following equation is used, conductivity=(R/dA), where R is the ohmic resistance calculated via Ohm's law, and d is the electrode effective thickness, and A is the electrode's area in contact with the titanium rods. As the tin powder is an electron conductor, and the polymeric binder a necessary but insulative resistor, a higher ratio of polymeric binder used in the tin electrode would lower its electronic conductivity, increasing the overall resistance of the battery. A higher overall resistance reduces the power, energy and cycle life capabilities of the battery device. Thus, it is vital to minimize the ratio of polymeric binders used, which can be done using the larger micron sized tin particles.

Example 6—First Cycle Coulombic Efficiency

To prepare the measurements, the as-fabricated tin electrode is electrochemically probed in a half cell configuration, which will isolate all effects from the counter electrode. In a typical half-cell, a tin electrode is paired against a reference electrode (such as a sodium metal chip), and separated by a liquid electrolyte soaked polyolefin separator. The half-cell is then discharged to a low voltage of 10 to 50 mV before being charged to 1.25V. A slow constant current of C/10 is used to perform this measurement at room temperature. The first cycle coulombic efficiency can be determined by the ratio between the capacity obtained in the discharge cycle to the capacity obtained in the charge cycle. The capacity utilization of the electrode can be determined by the ratio between the $1^{st}$ discharge capacity obtained to the theoretical capacity of tin (847 mAh/g).

Figure 5:
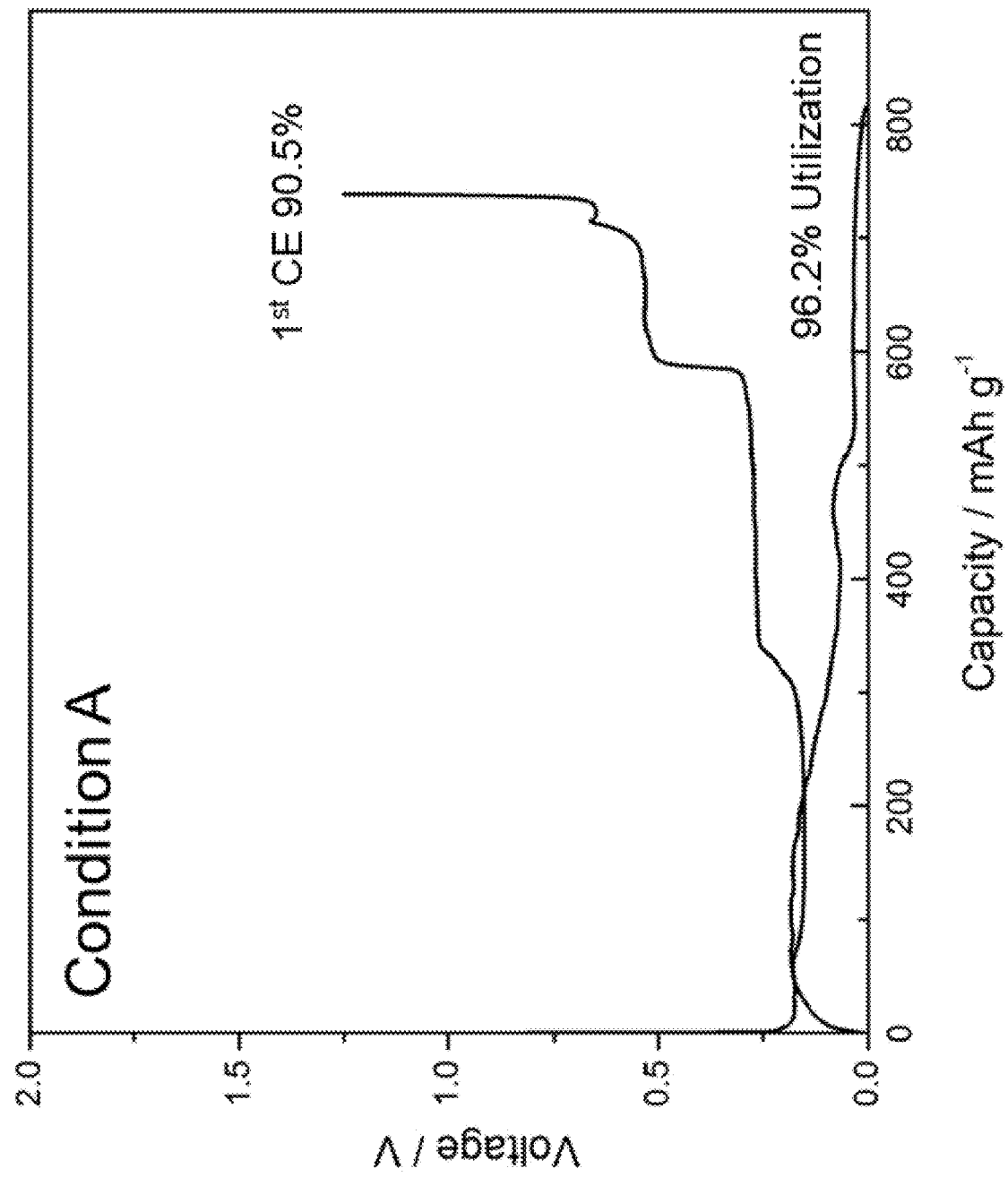
FIG. 5 shows the 1st cycle half-cell voltage curve, 1st cycle coulombic efficiency and capacity utilization of a sodium secondary battery comparing the tin (Sn) anodes with condition A particle sizes 5-50 μm using a current density of C/10 in some embodiments.

FIG. 5 shows the 1 st cycle half-cell voltage curve, 1st cycle coulombic efficiency and capacity utilization of a sodium secondary battery comparing the tin (Sn) anodes with condition A particle sizes 5-50 μm using a current density of C/10. A high-capacity utilization of 96.2% is found, which indicates that nearly all the tin particles are electrochemically active, and remain electrochemically active throughout the sodiation process. This also shows that the mechanical integrity is well maintained in the electrode using this Condition A. During the reverse cycle, a high first cycle coulombic efficiency of 90.5% is achieved, which indicates that the process is highly reversible and the mechanical and electrochemical integrity of the electrode is also maintained in the reverse cycle. The various plateaus of the half cell are also clearly defined, indicating clear phase changes of the tin from Sn to $Na_{15}Sn_4$.

Figure 6:
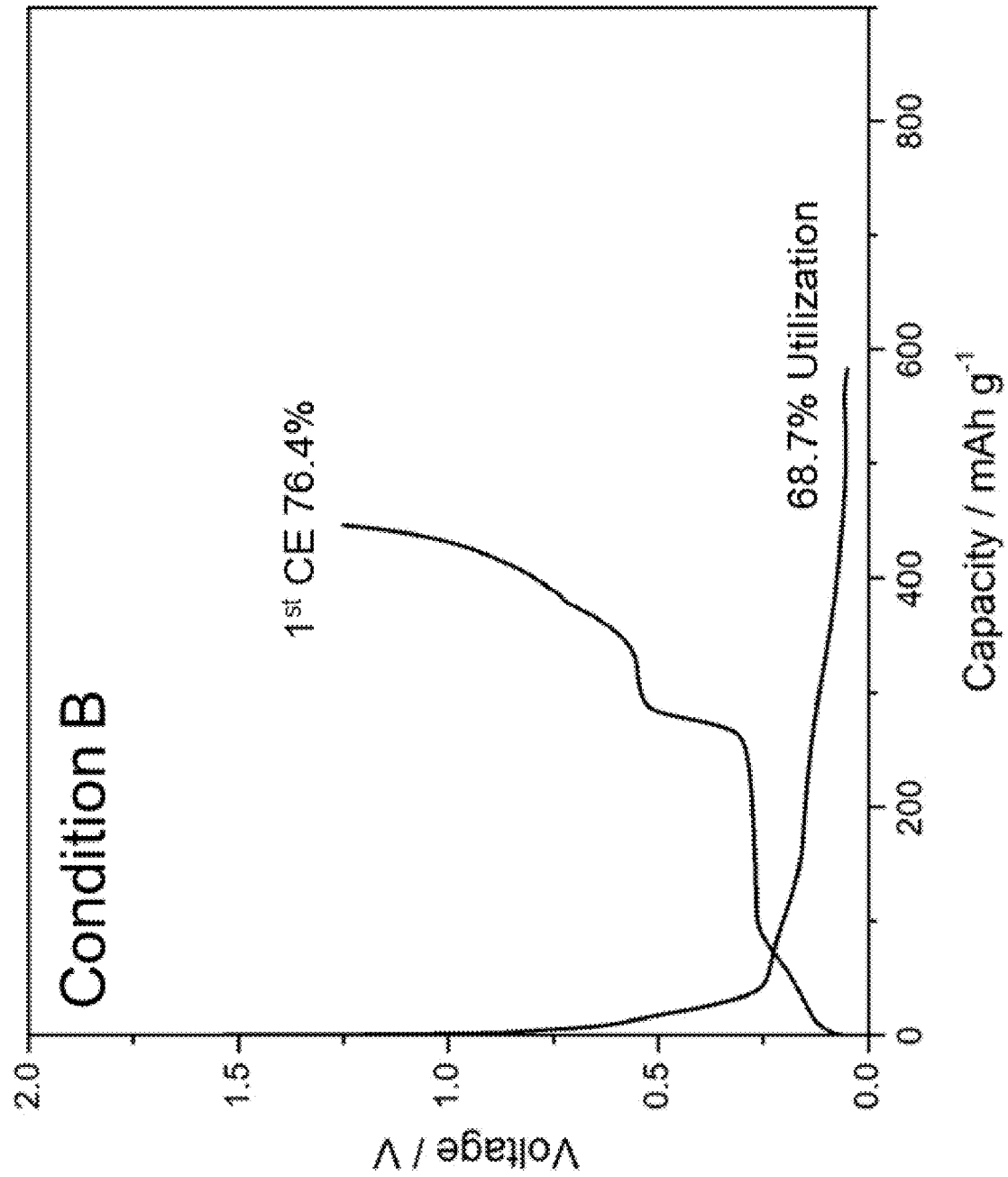
FIG. 6 shows the 1 st cycle half-cell voltage curve, 1st cycle coulombic efficiency and capacity utilization of a sodium secondary battery comparing the tin (Sn) anodes with condition B particle sizes 1-5 μm using a current density of C/10 in some embodiments.

FIG. 6 shows the 1st cycle half-cell voltage curve, 1st cycle coulombic efficiency and capacity utilization of a sodium secondary battery comparing the tin (Sn) anodes with condition B particle sizes 1-5 μm using a current density of C/10. A moderate-capacity utilization of 68.7% is found, which indicates that not all the tin particles are electrochemically active, and some remain electrochemically isolated and inaccessible throughout the sodiation process. This also shows that the mechanical integrity may be damaged in the electrode using this Condition B. During the reverse cycle, a moderate first cycle coulombic efficiency of 76.4% is achieved, which indicates that the process is not very reversible and the mechanical and electrochemical integrity of the electrode is also degraded in the reverse cycle. The various plateaus of the half cell are not well defined, indicating that phase changes of the tin from Sn to $Na_{15}Sn_4$ are incomplete and not fully formed.

Figure 7:
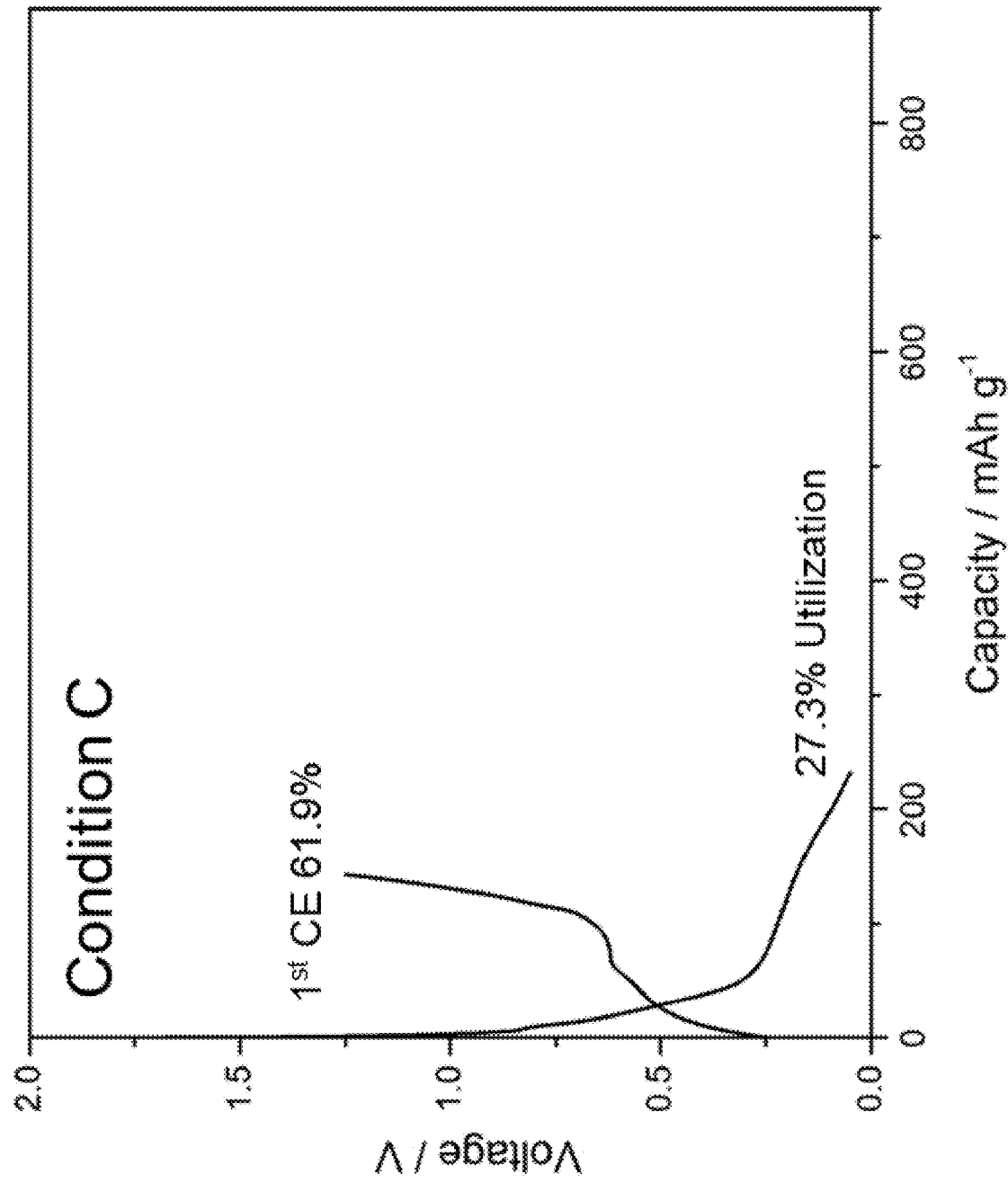
FIG. 7 shows the 1st cycle half-cell voltage curve, 1st cycle coulombic efficiency and capacity utilization of a sodium secondary battery comparing the tin (Sn) anodes with condition C sizes <1 μm using a current density of C/10 in some embodiments.

FIG. 7 shows the 1st cycle half-cell voltage curve, 1st cycle coulombic efficiency and capacity utilization of a sodium secondary battery comparing the tin (Sn) anodes with condition C sizes <1 μm using a current density of C/10. A low-capacity utilization of 27.3% is found, which indicates that a few of the tin particles are electrochemically active, and most remain electrochemically isolated and inaccessible throughout the sodiation process, this is also confirmed by the digital images in FIG. 12 showing that the electrode breaks apart during sodiation. This also shows that the mechanical integrity completely failed in the electrode using this Condition C. During the reverse cycle, a low first cycle coulombic efficiency of 61.9% is achieved, which indicates that the process is not very reversible and the mechanical and electrochemical integrity of the electrode is also degraded in the reverse cycle. The various plateaus of the half cell are not well defined, indicating that phase changes of the tin from Sn to $Na_{15}Sn_4$ are incomplete and not fully formed.

Figure 8:
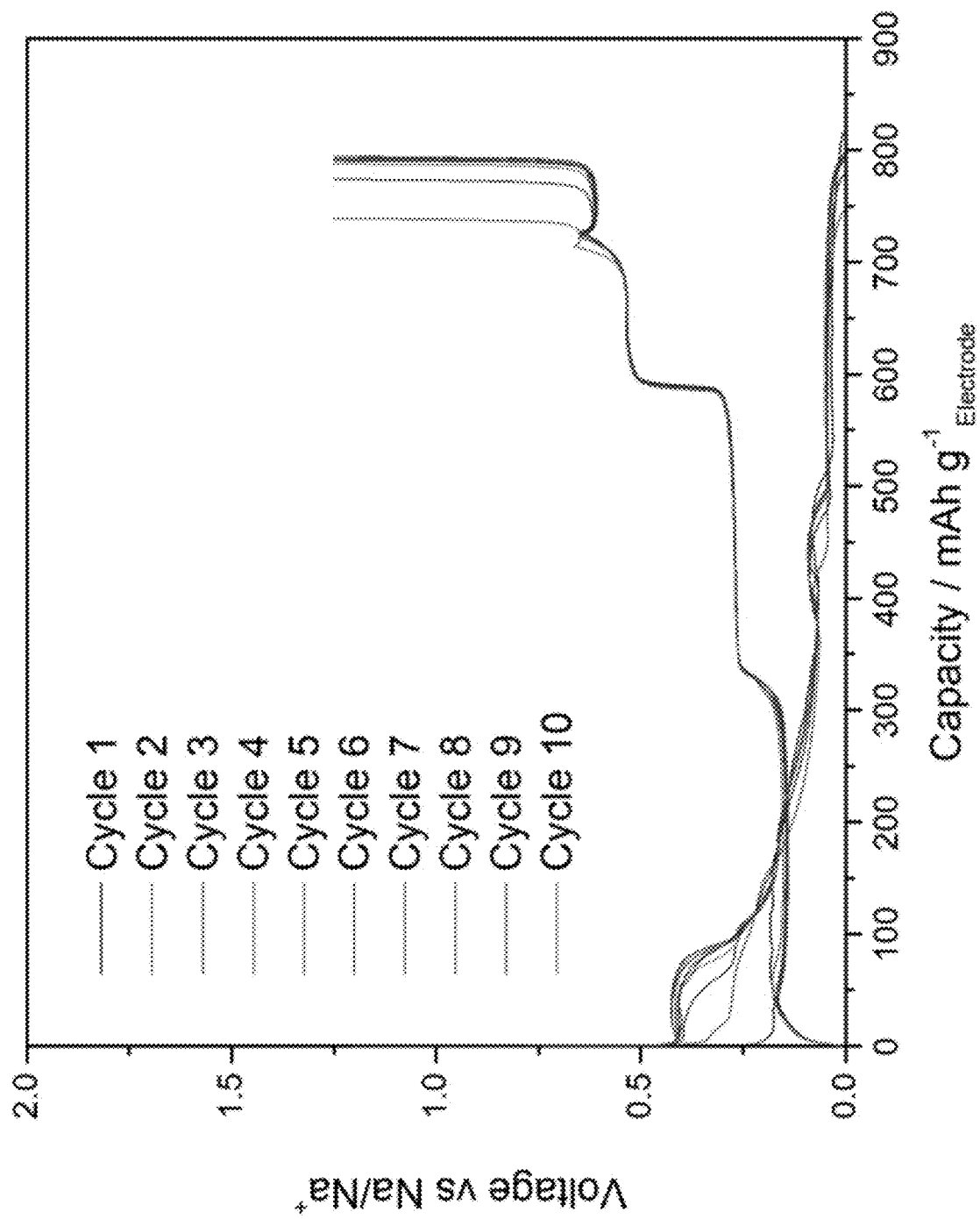
FIG. 8 shows the repeated half cell cycling voltage curve of the pristine tin (Sn) with condition A particle size (5-50 μm) over the first 10 cycles. Demonstrating the intrinsic stability and good reversibility of the material in some embodiments.

FIG. 8 shows the continued half-cell voltage curve, over 10 cycles of a sodium secondary battery using the tin (Sn) anodes with condition A particle sizes 5-50 μm using a current density of C/10. After the first cycle, the reversible capacity of the tin electrode increases, and continues to increase before stabilizing at the $5^{th}$ cycle. This trend indicates that while some of the tin particles (~10%) may appear to be electrochemically inactive at the first cycle, it is actually kinetically limited and require an activation time to access. Once fully accessed, the tin electrode using this Condition A remains highly stable and reversible, indicating that it continues to retain its mechanical and electrochemical properties after repeated sodiation and desodiation processes. The various plateaus of the half cell are also clearly defined through the 10 cycles, indicating clear phase changes of the tin from Sn to $Na_{15}Sn_4$.

Figure 9:
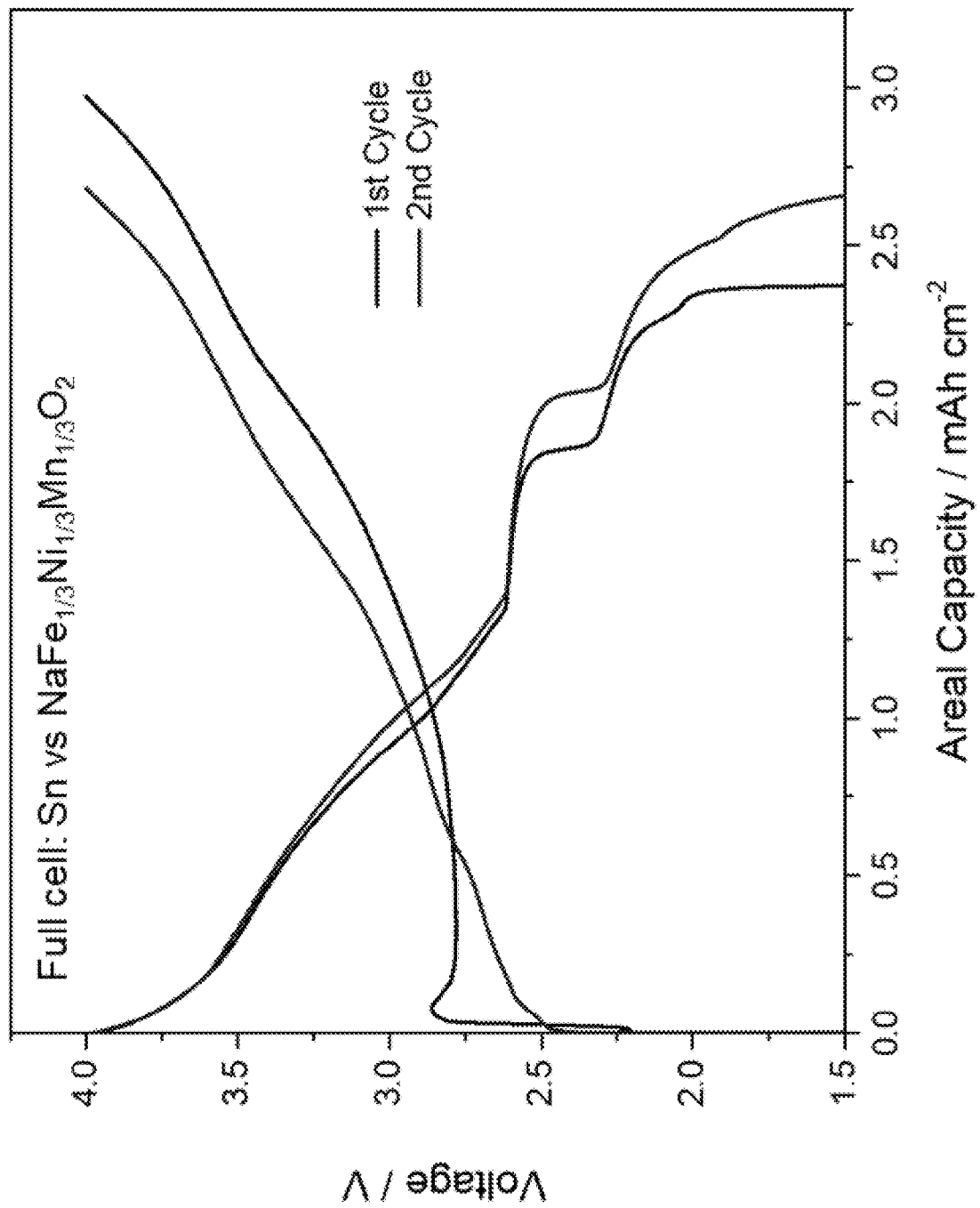
FIG. 9 shows the full cell 1st cycle voltage curve of the pristine tin (Sn) with condition A particle size (5-50 μm) when paired against a $NaNi_{1/3}Fe_{1/3}Mn_{1/3}O_2$ cathode material. Demonstrating its compatibility with a higher voltage cathode material.

FIG. 9 shows the full cell $1^{st}$ and $2^{nd}$ cycle voltage curve of the pristine tin (Sn) with condition A particle size (5-50 μm) when paired against a $NaNi_{1/3}Fe_{1/3}Mn_{1/3}O_2$ cathode material. Demonstrating its compatibility with a higher voltage cathode material. Similar to the findings in FIG. 8. The reversible capacity of the $2^{nd}$ cycle increased after the $1^{st}$ cycle, due to the activation time needed to fully access all the tin particles in the electrode.

Figure 11:
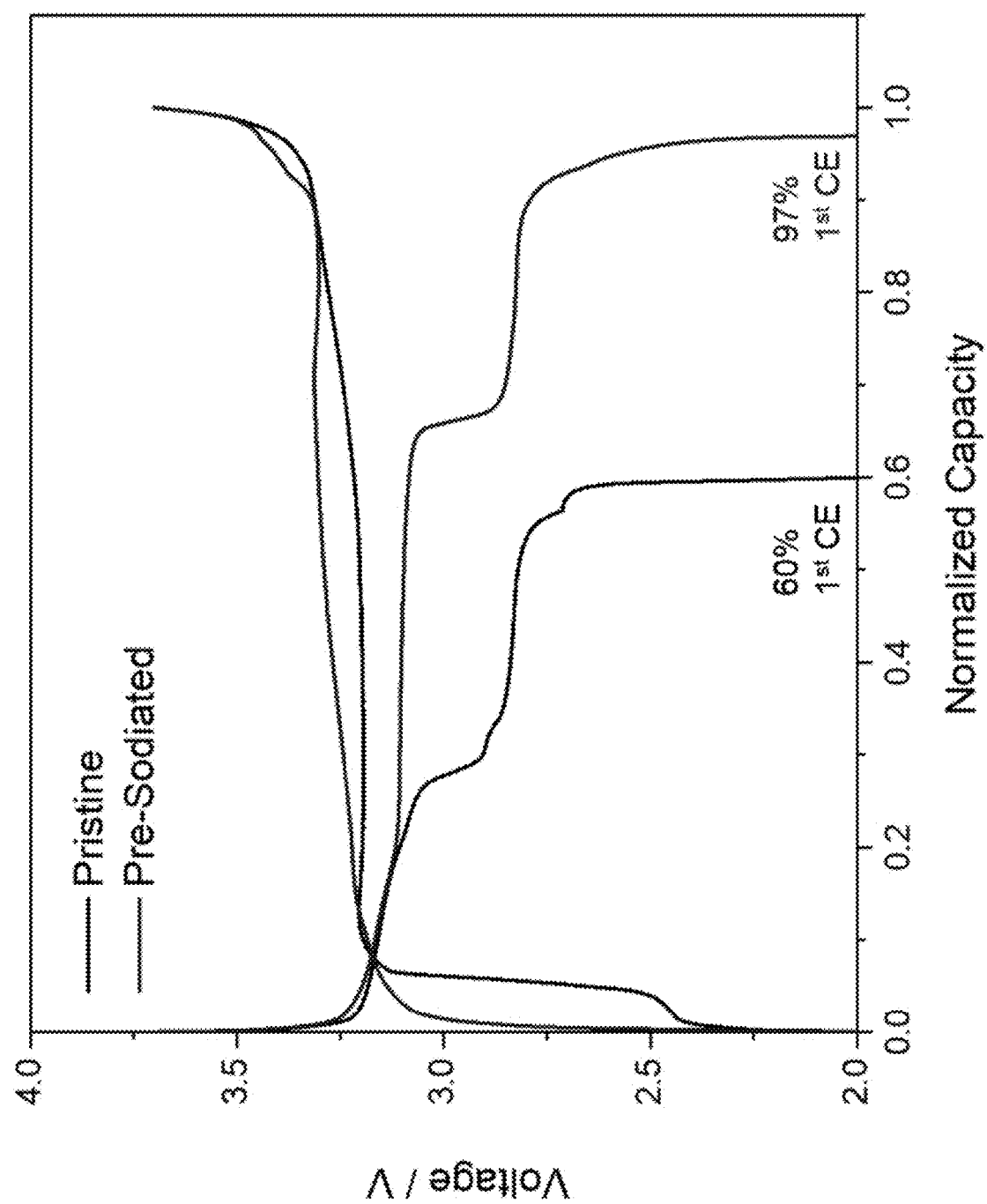
FIG. 11 shows the 1st cycle full-cell voltage curve and coulombic efficiency of pristine vs pre-sodiated tin (Sn) with condition A particle size (5-50 μm), which demonstrates the compatibility of condition A particle size tin (Sn) with the pre-sodiation process in some embodiments.

FIG. 11 shows another use case of the tin electrode comparing the 1st cycle full-cell voltage curve and coulombic efficiency of pristine vs pre-sodiated tin (Sn) with condition A particle size (5-50 μm) using a higher NP ratio of >2.0. Due to the high NP ratio used here, a lower $1^{st}$ cycle full cell efficiency of 60% is achieved without presodiation. After presodiation is used, a $1^{st}$ cycle full cell efficiency increases to 97%. Demonstrating the compatibility of condition, A particle size tin (Sn) with the pre-sodiation process.

Example 7—Capacity Retention

Figure 10:
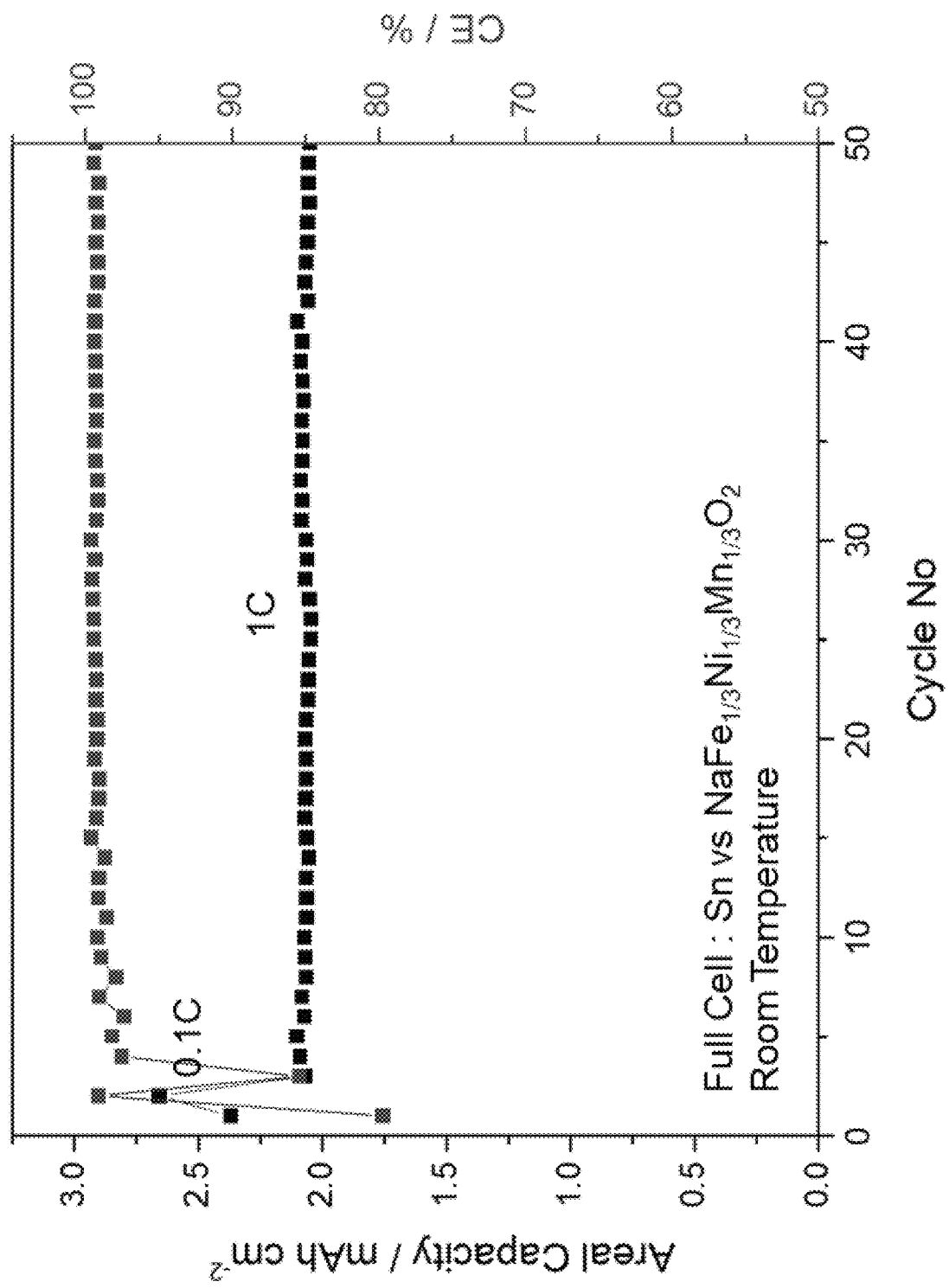
FIG. 10 shows the full cell capacity retention of the pristine tin (Sn) with condition A particle size (5-50 μm) when paired against a $NaNi_{1/3}Fe_{1/3}Mn_{1/3}O_2$ cathode material. Demonstrating its stability when paired with a higher voltage cathode material in some embodiments.

FIG. 10 shows the capacity retention of the full cell from FIG. 9 operating at a higher constant current density of 1C. Showing that the tin anode remains fully reversible and stable over 50 cycles.

Figure 14:
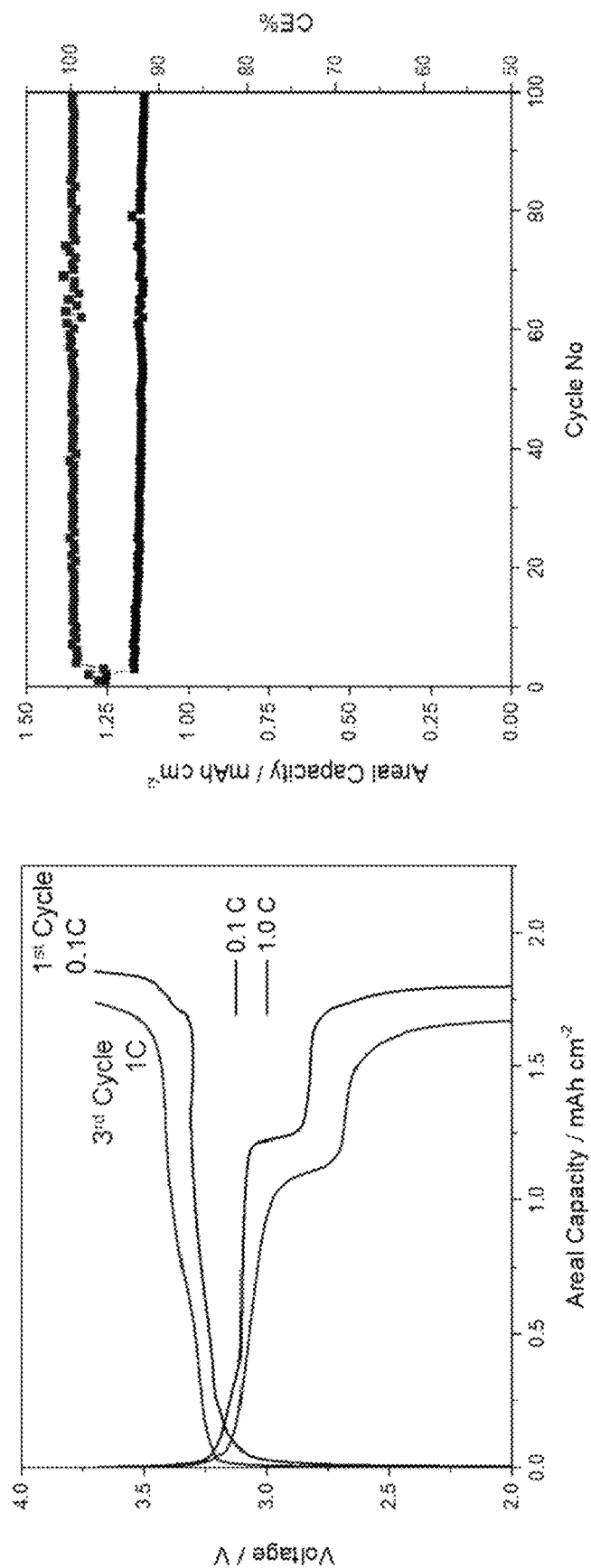
FIG. 14 shows the full cell voltage curve and first 100 cycles capacity retention of pre-sodiated tin (Sn) using condition A particle sizes when cycled with an ether based organic liquid electrolyte. The first two cycles were operating at C/10, and subsequent cycles are operating at 1C rate. Showing that larger particle sizes tin used in this invention do not undergo cell degradation typically seen in smaller particle sizes in some embodiments.

FIG. 14 shows the full cell voltage curve and first 100 cycles capacity retention of tin (Sn) using condition A particle sizes when cycled with an ether based organic liquid electrolyte. The first two cycles were operating at C/10, and subsequent cycles are operating at 1C rate. Showing that larger particle sizes tin used in this invention do not undergo cell degradation typically seen in smaller particle sizes.

Example 9—High-Rate Capability

Figure 13:
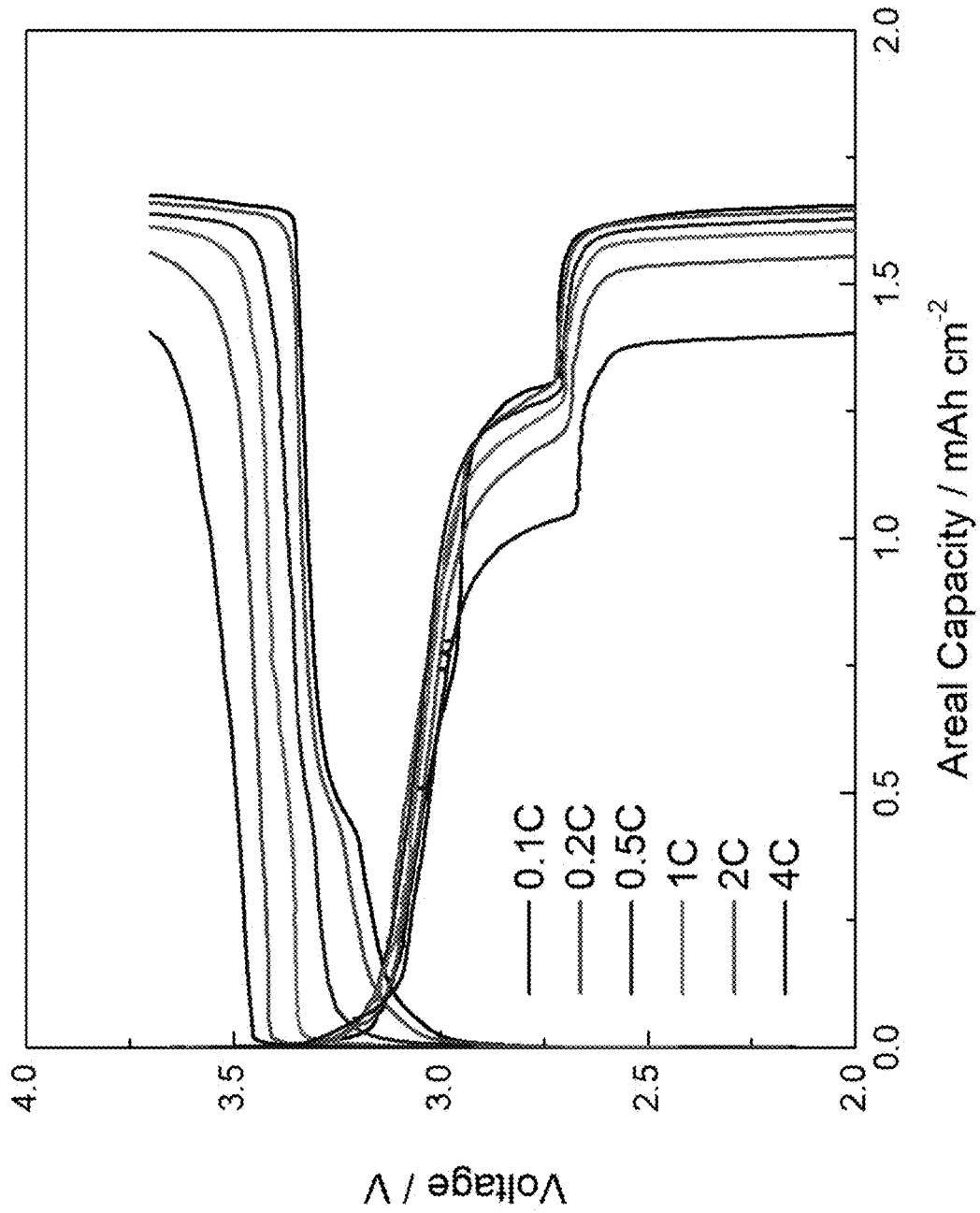
FIG. 13 shows the full cell voltage curve and high-rate capability of pre-sodiated tin (Sn) when cycled with an ether based organic liquid electrolyte. The discharge rates were fixed at C/3, while the charge rates were increased at every cycle from 0.1C to up 4C in some embodiments.

FIG. 13 shows the full cell voltage curve and high-rate capability of tin (Sn) when cycled with an ether based organic liquid electrolyte, and paired against a high rate $Na_3V_2(PO_4)_3$ reference cathode. The discharge rates were fixed at C/3, while the charge rates were increased at every cycle from 0.1C to up 4C, a constant current mode is applied for the charge and discharge cycles. It is seen that the capacity utilization does not change significantly for rates applied from 0.1C up to 1C. At 2C, more than 90% of the battery's capacity can be charged within 25 minutes, and at 4C, more than 85% of the battery's capacity can be charged within 10 minutes. This indicates that the tin electrode using particles from Condition A exhibit high transport kinetics, and can maintain its structural and mechanical integrity under the high current rates applied.

Of note, the exemplar embodiments of the disclosure described herein do not limit the scope of the invention since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

What is claimed is:

1. A sodium (Na) battery comprising:
   a) a negative electrode comprising a current collector and an active material layer, wherein the negative electrode active material layer comprises a negative electrode active material, wherein the negative electrode active material comprises a plurality of tin (Sn) particles comprising at least about 95 wt % of of tin (Sn);
   b) a positive electrode; and
   c) an electrolyte comprising a sodium ion,
      wherein the plurality of particles has an average particle diameter of from about 5 μm to about 70 μm, and
      wherein the electrolyte is (1) a liquid electrolyte comprising a sodium salt and an ether based solvent, or (2) a solid electrolyte comprising a solid borohydride material or a solid sulfide material.

2. The sodium (Na) battery of claim 1, wherein the plurality of tin (Sn) particles has an average particle diameter of about 55 μm or less.

3. The sodium (Na) battery of claim 1, wherein the plurality of particles has an average particle diameter of from about 5 μm to about 50 μm.

4. The sodium (Na) battery of claim 1, wherein the plurality of particles has a mass density from about 1 $g/cm^3$ to about 8 $g/cm^3$.

5. The sodium (Na) battery of claim 1, wherein the plurality of particles has a mass density of from about 1 $g/cm^3$ to about 7.2 $g/cm^3$.

6. The sodium (Na) battery of claim 1, wherein the negative electrode active material further comprises a binder resin.

7. The sodium (Na) battery of claim 1, wherein the negative electrode active material exhibits an electronic conductivity of from about $10^{-8}$ S $cm^{-1}$ to about 1000 S $cm^{-1}$ between the positive electrode and the negative electrode.

8. The sodium (Na) battery of claim 1, wherein the negative electrode active material exhibits an electronic conductivity of from $10^{-7}$ S $cm^{-1}$ to 100 S $cm^{-1}$ between the positive electrode and the negative electrode.

9. The sodium (Na) battery of claim 1, wherein the negative electrode active material exhibits an electronic conductivity of from $10^{-5}$ S $cm^{-1}$ to −10 S $cm^{-1}$ between the positive electrode and the negative electrode.

10. The sodium (Na) battery of claim 1, wherein the negative electrode active material layer further comprises conductive carbon or a conductive carbon-based material.

11. The sodium (Na) battery of claim 10, wherein the conductive carbon or a conductive carbon-based material comprises hard carbon, carbon nano tube, carbon fiber, or any combination thereof.

12. The sodium (Na) battery of claim 1, wherein the negative electrode active material layer has an average thickness of from about 10 μm to about 200 μm.

13. The sodium (Na) battery of claim 1, wherein the negative active material layer has an average thickness of from about 10 μm to about 70 μm.

14. The sodium (Na) battery of claim 1, wherein the negative electrode active material layer has an average thickness of from about 3 μm to about 50 μm.

15. The sodium (Na) battery of claim 1, wherein the negative electrode active material layer has a bulk density before first charge/discharge cycle of about 1 to about 7.2 $g/cm^3$.

16. The sodium (Na) battery of claim 1, wherein the electrolyte is a liquid electrolyte.

17. The sodium (Na) battery of claim 1, wherein the battery has a ratio of negative electrode to positive electrode capacity (NP ratio) of 0.5 to 10.

18. The sodium (Na) battery of claim 17, wherein the battery has a ratio of negative electrode to positive electrode capacity (NP ratio) of 1.0 to 5.

19. The sodium (Na) battery of claim 1, wherein the electrolyte is the liquid electrolyte comprising a sodium salt and an ether based solvent.

20. The sodium (Na) battery of claim 1, wherein the electrolyte is the solid electrolyte comprising a solid borohydride material or a solid sulfide material.

* * * * *